US006858287B2

(12) United States Patent
Fields

(10) Patent No.: US 6,858,287 B2
(45) Date of Patent: Feb. 22, 2005

(54) FORMABLE BRIGHT FILM HAVING DISCONTINUOUS METALLIC LAYERS

(75) Inventor: Thomas R. Fields, Charlotte, NC (US)

(73) Assignee: Soliant LLC, Lancaster, SC (US)

( * ) Notice: Subject to any disclaimer, the term of this patent is extended or adjusted under 35 U.S.C. 154(b) by 212 days.

(21) Appl. No.: 09/927,753

(22) Filed: Aug. 10, 2001

(65) Prior Publication Data

US 2003/0031891 A1 Feb. 13, 2003

(51) Int. Cl.[7] .......................... B32B 15/00; B32B 15/04; B32B 15/02; B32B 27/00; B32B 27/06
(52) U.S. Cl. ...................... 428/209; 428/626; 428/601; 428/609; 428/910; 428/646; 428/642; 428/687; 428/612; 428/156; 428/215; 428/220; 428/457; 428/500; 428/409
(58) Field of Search .................. 428/626, 209, 428/601, 609, 610, 646, 642, 687, 612, 624, 156, 215, 220, 343, 421, 422, 457, 461, 500, 463, 409

(56) References Cited

U.S. PATENT DOCUMENTS

| | | | | |
|---|---|---|---|---|
| 3,716,359 A | * | 2/1973 | Sheridon ........................ 96/1 |
| 3,842,406 A | * | 10/1974 | Sheridon ................ 340/173 R |
| 3,853,614 A | * | 12/1974 | Sheridon .................... 117/217 |
| 4,101,698 A | | 7/1978 | Dunning et al. .............. 428/31 |
| 4,115,619 A | | 9/1978 | Kurfman et al. ............ 428/336 |
| 4,318,978 A | * | 3/1982 | Borrelli et al. .............. 430/346 |
| 4,403,004 A | | 9/1983 | Parker et al. .................. 428/31 |
| 4,407,871 A | * | 10/1983 | Eisfeller ...................... 428/31 |
| 4,431,711 A | | 2/1984 | Eisfeller ...................... 428/31 |
| 4,671,985 A | | 6/1987 | Rodrigues et al. .......... 428/215 |
| 4,810,540 A | | 3/1989 | Ellison et al. ................ 428/31 |
| 4,875,262 A | | 10/1989 | DeGrave ................... 29/121.8 |
| 4,877,683 A | | 10/1989 | Bragaw, Jr. et al. ........ 428/421 |
| 4,913,760 A | | 4/1990 | Benson et al. ......... 156/244.11 |
| 4,918,800 A | | 4/1990 | Reafler ...................... 29/527.2 |
| 4,931,324 A | | 6/1990 | Ellison et al. ................ 428/31 |
| 4,943,680 A | | 7/1990 | Ellison et al. .............. 427/154 |
| 4,988,540 A | | 1/1991 | Bragaw, Jr. et al. ........ 427/155 |
| 5,035,940 A | | 7/1991 | Winton et al. .............. 428/174 |
| 5,037,680 A | | 8/1991 | Papendick et al. ............. 428/31 |
| 5,055,346 A | | 10/1991 | Rohrbacher ................. 428/210 |
| 5,118,372 A | | 6/1992 | Spahn ....................... 156/160 |
| 5,215,826 A | | 6/1993 | Shimanski et al. .......... 428/483 |
| 5,342,666 A | | 8/1994 | Ellison et al. ................ 428/46 |
| 5,353,154 A | | 10/1994 | Lutz et al. .................. 359/582 |
| 5,514,427 A | | 5/1996 | Ellison et al. ................ 428/31 |
| 5,518,786 A | | 5/1996 | Johnson et al. ............ 428/40.6 |
| 5,532,045 A | | 7/1996 | Wade ......................... 428/187 |
| 5,536,539 A | | 7/1996 | Ellison et al. ................ 428/31 |
| 5,653,927 A | | 8/1997 | Flynn et al. ................ 264/134 |
| 5,684,633 A | | 11/1997 | Lutz et al. .................. 359/588 |
| 5,707,697 A | | 1/1998 | Spain et al. .................. 428/31 |
| 5,711,993 A | * | 1/1998 | Lein et al. .................. 427/250 |
| RE35,739 E | | 2/1998 | Ellison et al. ................ 428/31 |
| 5,725,712 A | | 3/1998 | Spain et al. ................ 156/230 |
| 5,750,234 A | | 5/1998 | Johnson et al. ............. 428/141 |
| RE35,894 E | | 9/1998 | Ellison et al. ................ 428/46 |
| RE35,970 E | | 11/1998 | Ellison et al. ................ 428/31 |
| 5,895,624 A | | 4/1999 | Reece et al. ................ 264/554 |
| 5,916,643 A | | 6/1999 | Spain et al. .................. 428/31 |
| 5,919,537 A | | 7/1999 | Niazy ........................ 428/40.1 |
| 5,926,360 A | * | 7/1999 | Laibowitz et al. ......... 361/321.4 |
| 5,960,527 A | | 10/1999 | Ellison et al. ................ 29/428 |
| 5,962,121 A | | 10/1999 | Mori ......................... 428/323 |
| 5,968,657 A | | 10/1999 | Scullin et al. ............. 428/423.1 |
| 5,968,663 A | | 10/1999 | Muggli ...................... 428/461 |
| 5,985,079 A | | 11/1999 | Ellison .................. 156/244.23 |
| 5,985,418 A | * | 11/1999 | Lein et al. .................. 428/195 |
| RE36,457 E | | 12/1999 | Ellison et al. ................ 428/31 |
| 6,017,639 A | | 1/2000 | Higginbotham et al. .... 428/458 |
| 6,057,236 A | * | 5/2000 | Clevenger et al. .......... 438/680 |
| 6,071,621 A | | 6/2000 | Falaas et al. ............. 428/425.8 |
| 6,083,335 A | | 7/2000 | Scullin et al. .............. 156/196 |
| 6,083,628 A | | 7/2000 | Yializis ...................... 428/463 |
| 6,093,278 A | | 7/2000 | Wade ......................... 156/292 |
| 6,238,776 B1 | * | 5/2001 | Lein et al. .................. 428/195 |
| 6,287,672 B1 | | 9/2001 | Fields et al. ................ 428/209 |
| 6,335,142 B1 | * | 1/2002 | Quesnel et al. ........... 430/275.1 |
| 6,416,847 B1 | * | 7/2002 | Lein et al. .................. 428/209 |
| 6,455,138 B1 | * | 9/2002 | Murano ...................... 428/201 |
| 2001/0009713 A1 | * | 7/2001 | Lein et al. .................. 428/212 |
| 2001/0051255 A1 | * | 12/2001 | Fields et al. ................ 428/209 |
| 2002/0048665 A1 | * | 4/2002 | Fields et al. ................ 428/209 |
| 2002/0108708 A1 | * | 8/2002 | Murano .................... 156/307.3 |
| 2002/0192440 A1 | * | 12/2002 | Fields et al. ................ 428/209 |

FOREIGN PATENT DOCUMENTS

| | | |
|---|---|---|
| EP | 0 967 639 A1 * | 12/1999 |
| GB | 834744 * | 5/1960 |
| WO | WO 96/33026 * | 10/1996 |
| WO | WO 99/33649 A1 | 7/1999 |
| WO | WO 00/73061 A2 * | 12/2000 |

OTHER PUBLICATIONS

PCT International Search Report (Nov. 2002).*

DuPont®, Tedlar® Polyvinyl Fluoride Film Technical Information, *General Properties*, 4 pages, Printed in U.S.A. Oct. 1995.

(List continued on next page.)

*Primary Examiner*—Michael LaVilla
(74) *Attorney, Agent, or Firm*—Kennedy Covington Lobdell & Hickman, LLP

(57) ABSTRACT

The invention is a formable, bright metallized laminate that has superior optical and deformation properties. The metallized laminate is made from a plurality of discontinuous metal island layers deposited on a formable clear coat film. The invention is also a method that includes depositing a first discontinuous layer of metal islands upon a formable clear coat film and then depositing a second discontinuous layer of metal islands onto the first discontinuous layer of metal islands.

104 Claims, 9 Drawing Sheets

OTHER PUBLICATIONS

DuPont®, Tedlar® Polyvinyl Fluoride Film Product Information, *Adhesive and Lamination Guide for Tedlar® PVF Film*, 10 pages, Printed in U.S.A. Oct. 1995.

DuPont®, Tedlar® Polyvinyl Fluoride Film Technical Information, *Flexible Product Adhesives for Use with Tedlar® Polyvinyl Fluoride Film*, 2 pages, Printed in U.S.A. Oct. 1995.

DuPont®, Tedlar® SP Polyvinyl Fluoride Film Technical Information, *Laminating Guide*, 4 pages, Printed in U.S.A. Feb. 1999.

DuPont®, Tedlar® SP Polyvinyl Fluoride Film Technical Information, *Properties and Maintenance of High–Gloss Tedlar® SP Film in Laminate Applications*, 4 pages, Printed in U.S.A. Apr. 1997.

DuPont®, Tedlar® Polyvinyl Fluoride Film Technical Information, *Chemical Properties, Optical Properties, and Weatherability Performance*, 4 pages, Printed in U.S.A. Oct. 1995.

* cited by examiner 100 nm 100 nm 100 nm 100 nm 100 nm

FORMABLE BRIGHT FILM HAVING DISCONTINUOUS METALLIC LAYERS

FIELD OF THE INVENTION

The invention relates to bright film technology. In particular, the invention is a formable, bright metallized laminate made from a plurality of discontinuous metal island layers deposited on a formable clear coat film. The invention is also a method of making such formable metallized film laminates.

BACKGROUND OF THE INVENTION

Metallized polymeric finishes can be used to complement and even replace bright, reflective metal surface treatments, particularly chrome plating. Polymeric structures having metallized finishes are commonly used as substitutes for articles, such as automobile grills, that are expected to have a chrome-plated appearance. Decorative polymeric components, in fact, are becoming standard in the automobile industry, primarily because plastics are relatively flexible, corrosion-resistant, and inexpensive. Plastic parts also reduce vehicle weight, which enhances performance, especially fuel economy.

Many patents disclose metallized substrates. For example, U.S. Pat. No. 5,035,940, for an Aluminum-Fluoropolymer Laminate describes a polymer-backed aluminum substrate with a weather-resistant polymer coating. Similarly, U.S. Pat. No. 5,536,539, for an Injection Molded Plastic Article with Integral Weatherable Pigmented Film Surface describes an automotive component formed from a molded polymer article having a decorative polymeric film surface. Both of these patents are commonly-assigned with the present invention.

As will be known by those familiar with the metallizing arts, chrome plating is perhaps the most common method of metallizing three-dimensional substrates, such as injection-molded substrates. Unfortunately, chrome plating not only carries onerous environmental concerns, but also introduces possible human health hazards.

A better method of metallizing polymeric substrates is to coat metal onto molded substrates, usually by vacuum deposition. In this regard, indium has gained acceptance as a preferred metal because on a microscopic scale it tends to form small, discrete deposits or "islands." When bent or flexed, discontinuous metal layers tend to retain the desired optical properties better than do continuous metal films, which tend to fracture. Discrete metallization also minimizes electrical conductivity, which can hasten unwanted corrosion. For example, U.S. Pat. No. 4,431,711, for Vacuum Metallizing a Dielectric Substrate with Indium and Products Thereof addresses indium metallizing three-dimensional articles in a way that minimizes electrical conductivity and, consequently, corrosion.

In most cases, the metallized layer is covered with a transparent polymeric coating that physically and chemically protects its surface a so-called "clear coat." Although in-situ metallization of formed polymeric articles is useful, it requires separate applications of a base coat, a metallized layer, and a clear coat. This necessitates drying time for each application, which lengthens the processing times (and hence costs) associated with metallizing three-dimensional articles. Therefore, depositing metal directly onto an article only after the article has been formed can be disadvantageous.

Alternatively, metallized film laminates (e.g., adhesive tapes) that can be applied to polymeric structures offer certain advantages over conventional in-situ metallization techniques. For example, metallized film laminates can be manufactured, stored, and shipped in roll form. Such laminates also facilitate customized application, limited only by adhesive effectiveness. Moreover, using a metallized film laminate reduces chemical compatibility problems that can arise between the metal and the polymeric substrate when metallizing articles in-situ.

To manufacture a metallized film laminate, a polymeric substrate is typically coated with a desired metal, often via vacuum deposition. Then, a polymeric clear coat is added to the metallization layer using conventional techniques, such as casting or doctor-blade applications. Using such metallized film laminates, though convenient, can result in an inferior finish as compared to that obtained by in-situ techniques. Therefore, it is desirable to achieve a finish similar to an in-situ process, yet with the convenience of a film laminate.

To that end, there are known to be metallized laminates that can be formed into desired shapes using conventional techniques. In addition, such formed laminates can be filled with thermoplastic polymer to produce a solid article having a similar bright finish as an article that has been metallized by in-situ methods.

For example, U.S. Pat. No. 4,101,698, for Elastomeric Reflective Metal Surfaces discloses a metallized elastomeric laminate that can provide a reflective metal surface finish for three-dimensional contoured shapes. In particular, the metallized layer is applied to an elastomeric film in separate, discontinuous planar segments. U.S. Pat. No. 4,115,619, for Highly Reflective Multilayer Metal/Polymer Composites discloses a bright multi-layer polymer composite formed by metallizing a thermoplastic polymer layer with a soft metal, such as indium. The metal layer is applied by conventional techniques, such as vacuum deposition, sputtering, or lamination. The metallized film can then be molded into a desired shape using conventional forming processes. U.S. Pat. No. 4,403,004, for a Sandwich Metalized Resin Laminate describes a metallized laminate formed of a thermoformable base layer that is coated on both sides with vapor deposited metal. This laminate is capable of being thermoformed to assume three-dimensional shapes.

Such formable film laminates have poor flexibility, however, often cracking when the metallized substrates are deformed. Moreover, such moldable films tend to lose luster over time. This is particularly pernicious with respect to metallized indium layers, which in the presence of halogen-containing polymers (e.g., polyvinyl chloride) can undergo an oxidation-reduction reaction that converts elemental indium to indium trichloride. Finally, to the extent such films are formed from continuous metallized layers, corrosion problems result.

Commonly-assigned U.S. application Ser. No. 09/268,085, filed Mar. 12, 1999, for a Bright Metallized Film Laminate discloses a metallized laminate having superior optical and deformation properties as compared to the prior art, and novel methods of making the same. In particular, U.S. application Ser. No. 09/268,085 discloses a bright metallized laminate including a discontinuous layer of indium islands deposited on a microscopically-smooth surface of a polyvinylidene difluoride-containing film. In this regard, the polyvinylidene difluoride-containing film preferably includes between about 30 percent and 90 percent by weight of polyvinylidene difluoride and between about 10 percent and 70 percent by weight of an acrylic polymer. U.S. application Ser. No. 09/268,085 is hereby incorporated by reference in its entirety.

Commonly-assigned, copending U.S. application Ser. No. 09/882,601, filed Jun. 15, 2001, for a Bright Indium-Metallized Formable Film Laminate, which is a continuation-in-part of U.S. application Ser. No. 09/268,085, also discloses a bright metallized formable film laminate having excellent optical and deformation properties. In particular, the bright metallized formable film laminate preferably includes a formable, weatherable clear coat film comprising polyvinylidene difluoride, a formable clear coat leveling layer on the weatherable clear coat film, and a discontinuous layer of indium islands deposited on the formable leveling layer, opposite the weatherable clear coat film. U.S. application Ser. No. 09/882,601 is hereby incorporated by reference in its entirety.

Finally, commonly-assigned, copending U.S. application Ser. No. 09/882,663, filed Jun. 15, 2001, for a Bright Tin-Metallized Formable Film Laminate, discloses a bright metallized formable film laminate having improved scratch resistance and adhesion, while retaining excellent optical and deformation properties. In particular, the bright metallized formable film laminate preferably includes a discontinuous layer of tin islands deposited on a microscopically-smooth surface of a formable, fluoropolymer clear coat film, preferably polyvinyl fluoride or polyvinylidene difluoride. U.S. application Ser. No. 09/882,663 is hereby incorporated by reference in its entirety.

While the metallized laminates disclosed by commonly-assigned and copending U.S. application Ser. Nos. 09/268,085, 09/882,601, and 09/882,663, offer significant improvement over the prior art, a need exists for alternative formable, bright metallized laminates that have possess superior optical and deformation properties.

OBJECT AND SUMMARY OF THE INVENTION

Therefore, it is an object of the present invention to provide a bright metallized film laminate having superior optical and deformation properties, and a method of making such film laminates.

In one aspect, the invention is a bright, formable laminate having a plurality of discontinuous layers of metal islands deposited on a formable clear coat film. Preferably, the discontinuous metal layers include microscopic transitional sub-layers. The presence of multiple metallic layers facilitates the retention of optical and reflective properties as the formable laminate is stretched.

In another aspect, the invention is a method of depositing a plurality of discontinuous layers of metal islands upon a formable clear coat film. Preferably, the method includes surface treating the discontinuous metal layers either by metal oxide deposition or, more preferably, by plasma treatment. In some instances, the method may also include the step of press polishing the clear coat film to make it microscopically smooth, thereby enhancing the optical clarity of the resulting metallized film.

In yet another aspect, the invention is a part formed from the bright metallized laminate.

The foregoing, as well as other objectives and advantages of the invention and the manner in which the same are accomplished, is further specified within the following detailed description and its accompanying drawings.

DETAILED DESCRIPTION OF THE INVENTION

Figure 1:
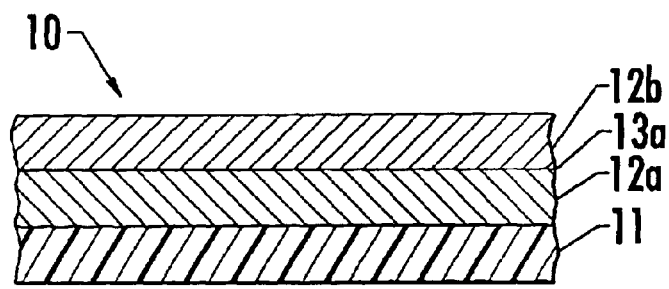
FIG. 1 is a schematic cross-sectional view of the formable metallized laminate having a plurality of discontinuous metal layers on a formable clear coat film.

The invention is a formable, bright metallized laminate made from a plurality of discontinuous metal island layers deposited on a formable clear coat film.

The invention is also a method for making a formable, bright metallized laminate. In a broad aspect, the method includes depositing a first discontinuous layer of metal islands upon a formable clear coat film and then depositing a second discontinuous layer of metal islands onto the first discontinuous layer of metal islands.

Embodiments of the invention are illustrated by several of the drawings, which are cross-sectional and schematic in nature. These drawings are not drawn to scale, but instead are intended to illustrate the various layers in the films of the invention and their positional relationships to one other within the laminate structure. For consistency and clarity, each drawing designates the particular layers by the same reference numerals.

That said, in one aspect, depicted by FIG. 1, the formable metallized laminate 10 includes a formable clear coat film 11, a first discontinuous layer of metal islands 12a, and a second discontinuous layer of metal islands 12b (i.e., the first discontinuous metal layer 12a is positioned between the formable clear coat film 11 and the second discontinuous metal layer 12b).

Preferably, the first discontinuous metal layer is bonded to the formable clear coat film at an adhesion strength (i.e., peel strength) of at least about two pounds per inch as measured essentially according to ASTM Method 1876 (Peel Resistance of Adhesives). In particular, ASTM Method 1876 is modified to determine the peel strength over two inches after implementing a 1800 peel at 4 in/min rather than the peel resistance over five inches after implementing a 90° T-peel at 10 in/min.

Figure 2:
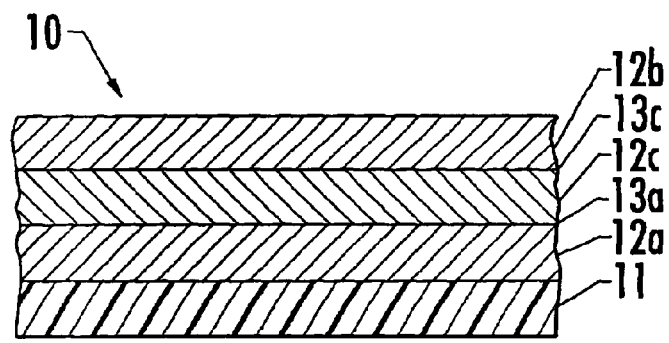
FIG. 2 is also a schematic cross-sectional view of the formable metallized laminate having a plurality of discontinuous metal layers on a formable clear coat film.

In another aspect, depicted by FIG. 2, the metallized laminate 10 further includes at least one additional discontinuous layer of metal islands 12c positioned between the first discontinuous metal layer 12a and the second discontinuous metal layer 12b. Stated otherwise, the discontinuous metal island layers 12 include a first outer discontinuous layer of metal islands 12a that is deposited on the clear coat film 11, a second outer discontinuous layer of metal islands 12b, and at least one inner discontinuous layer of metal islands 12c positioned between the first and second outer discontinuous metal layers 12a–12b. That is, a plurality of discontinuous metal layers is deposited upon the clear coat film. It will be appreciated by those skilled in the art that the first discontinuous metal layer 12a and the second discontinuous metal layer 12b are both outer discontinuous metal layers.

As will be known to those of skill in the art, vapor deposition and sputtering are conventional methods for achieving the metal layers. See Wasa and Hayakawa, Handbook of Sputter Deposition Technology (1992). These techniques are well known and will not be further described herein.

It will be appreciated by those of ordinary skill in the art that, as used herein, the concept of a layer being positioned on another layer, or being "between" two other layers does not necessarily imply that the layers are contiguous (i.e., in intimate contact). Rather, as used herein, the concept of a layer being positioned on another layer or between two other layers is meant to describe the relative positions of the layers within the laminate structure. Similarly, as used herein, in a description of a first layer being in contact with a second layer, "opposite" a third layer, the term "opposite" is intended to disclose the relative positions of the first and second layers within the laminate structure.

That said, in preferred laminate embodiments, the discontinuous metal layers 12 are contiguous. In this regard, as depicted by FIG. 1, the first discontinuous metal layer 12a has a first surface that is contiguous to the formable clear coat film 11, and a second surface that is contiguous to the second discontinuous metal layer 12b. In these kind of contiguous embodiments, it is preferred to include a microscopic transitional sub-layer 13a at the second surface of the first discontinuous metal layer 12a.

Similarly, as depicted by FIG. 2, in embodiments in which more than two contiguous, discontinuous metal layers are present in the laminate structure, the first outer discontinuous metal layer 12a and each inner discontinuous metal layer 12c preferably have a microscopic transitional sub-layer 13 at their respective surfaces opposite the formable clear coat film 11. In other words, again depicted by FIG. 2, microscopic transitional sub-layer 13a is formed at the interface of first outer discontinuous metal layer 12a and inner discontinuous metal layer 12c, and microscopic transitional sub-layer 13c is formed at the interface of inner discontinuous metal layer 12c and second outer discontinuous metal layer 12b. The second outer discontinuous metal layer 12b need not include a microscopic transitional sub-layer 13 as its surface opposite the formable clear coat film 11 is not adjacent to another discontinuous metal layer.

It will be understood by those of ordinary skill in the art that, for simplicity, FIG. 2 depicts only three discontinuous metal layers 12a, 12c, and 12b, but that additional inner discontinuous metal layers can be incorporated into the laminate structure. As will be further understood by those of ordinary skill in the art, each additional inner discontinuous metal layer preferably includes a microscopic transitional sub-layer that is formed at its surface opposite the formable clear coat film. That is, preferably each discontinuous layer of metal islands is surface treated before an additional contiguous, discontinuous layer of metal islands is deposited thereon.

Figure 3:
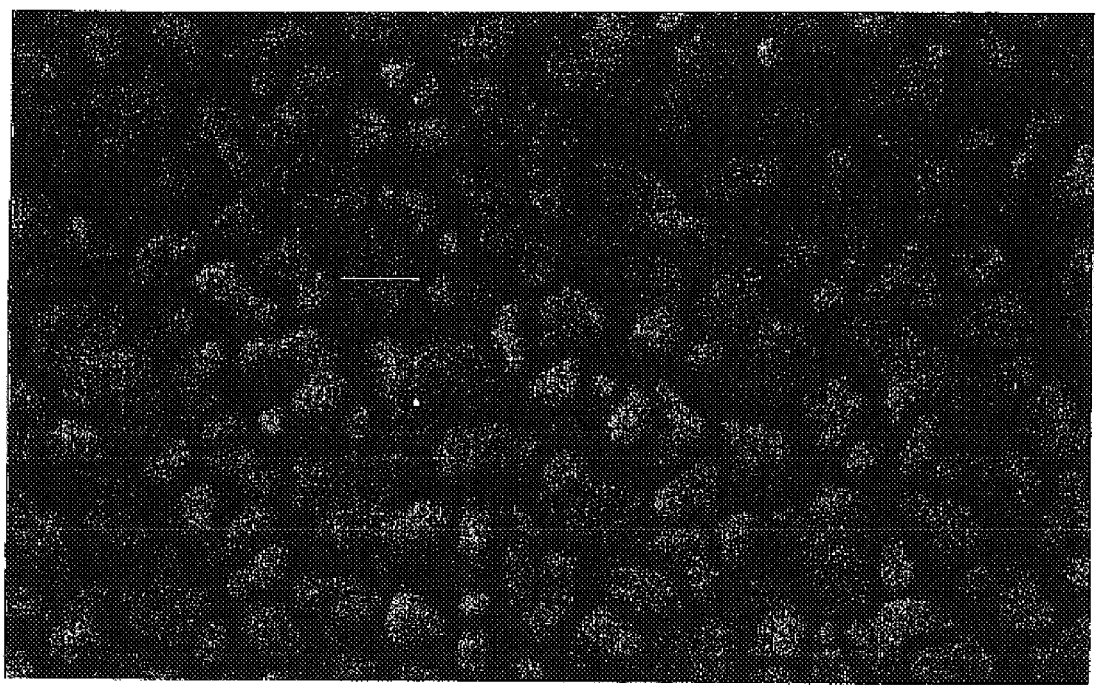
FIGS. 3–4 are microscopic, photographic views of a formable metallized laminate at different levels of stretch.
Figure 4:
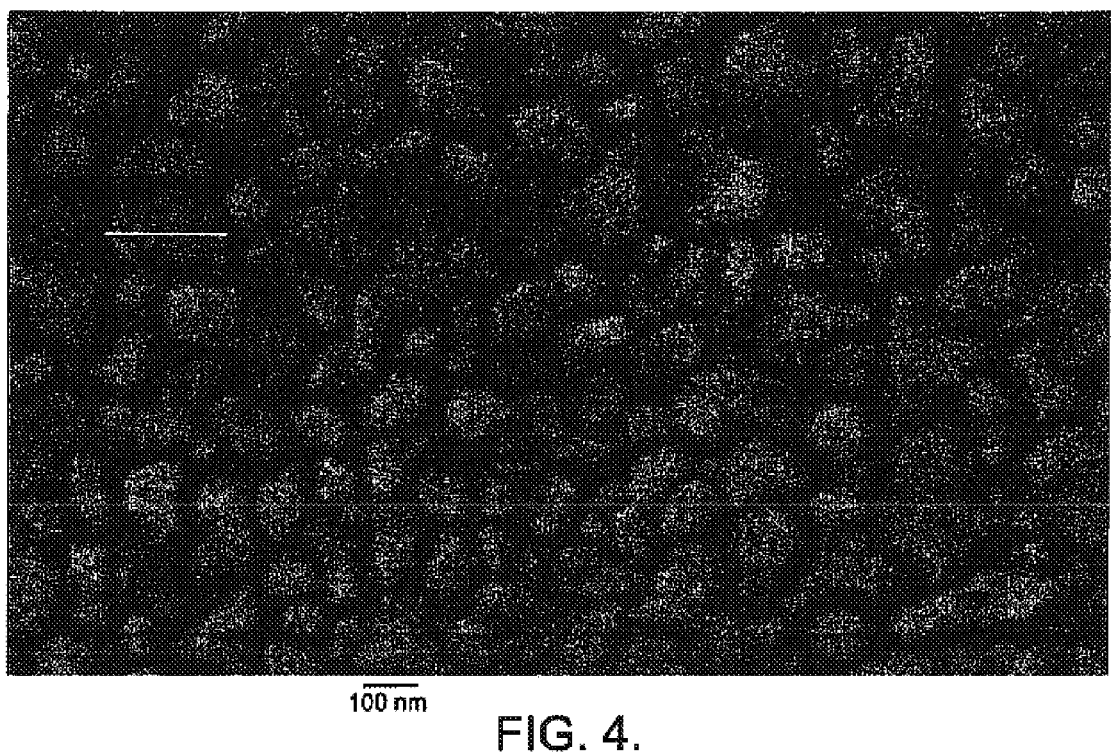

Incorporating a plurality of discontinuous layers of metal islands into the formable film laminate is particularly desirable where the film laminate is employed in high-stretch applications. FIGS. 3 and 4 are photographs, as taken from an electron microscope, of a formable indium-metallized laminate at different degrees of stretch. In particular, FIGS. 3 and 4 show the effects of stretching upon a layer of discontinuous indium islands, which appear as two-dimensional, somewhat irregular islands of varying sizes. With respect to FIG. 3, the line within the photograph is 134 nm. With respect to FIG. 4, the line is 207 nm. For convenience, a 100-nanometer scale (approximate) is also provided.

More specifically, one portion of the formable laminate (FIG. 3) has been subjected to a higher degree of stretch than another portion of the formable laminate (FIG. 4). In this regard, the indium islands shown in FIG. 3 demonstrate larger voids between one another.

It will be understood by those skilled in the art that, to the viewer, the discontinuous metal layer appears to be a continuous metal layer. In other words, the viewer integrates the overall appearance of the discontinuous layer of metal islands and sees a bright film. As this kind of a formable metallized laminate is stretched, however, the voids between islands become greater, and the metallized laminate darkens. Eventually, distinctiveness of image (DOI) and reflectivity are completely diminished (i.e., the image goes dark.)

Accordingly, it is thought that the supporting discontinuous metal layers (i.e., those in addition to the first discontinuous metal layer) provide a reflective filler as the space between adjacent metal islands in the first discontinuous metal layer increases. Stated otherwise, and referring to FIG. 2, when stretching of the metallized laminate 10 causes a gap to appear between adjacent metal islands in the first discontinuous metal layer 12a, one or more metal islands in discontinuous metal layers 12c and 12b fills the void. Without being bound to a particular theory, it is thought that in this way the formable laminate of the present invention provides superior optical and reflective properties for high stretch uses.

The deposition of a plurality of discontinuous metal layers, however, can be problematic. It has been observed that without a surface treatment to form a microscopic transitional sub-layer, the metal islands that are deposited in contiguous layers tend to consolidate into a single discontinuous layer. This increases the relative sizes of the metal islands, which tend to expand in all three dimensions as the thickness of the metal layer increases. It is thought that the consolidation of the metal islands into relatively larger metal islands undermines the effect of the plurality of discontinuous metal layers, namely the retention of reflective properties as the formable laminate is stretched.

In particular, a relatively thick discontinuous layer of metal islands tends to cause iridescence (i.e., light scattering) and to reduce distinctiveness of image (DOI) in the formable film laminate. For example, relatively larger indium islands can cause the film laminate of the present invention to appear yellowish, or even brownish.

The discontinuous metal islands preferably have an average width of less than about 400 nm, more preferably less than about 200 nm, and most preferably less than about 100 nm. Those of skill in the art will recognize that, as a practical matter, this is determined by analyzing the metal layer farthest from the formable clear coat film (e.g., the second outer discontinuous metal layer 12b of FIG. 2).

Without being bound to a particular theory, it is believed that chemically altering the surface of a discontinuous metal layer permits a contiguous layer of discontinuous metal islands to be deposited thereon. For example, with reference to FIG. 1, it is thought that treating the surface 13a of first discontinuous metal layer 12a facilitates the deposition and discrete formation of second contiguous, discontinuous metal layer 12b.

In one embodiment, at least one and preferably each microscopic transitional sub-layer is formed by plasma treatment. One preferred plasma treatment technique is to expose the metal islands to high-energy oxygen ions. Without being bound to a particular theory, it is believed that plasma treatment with high-energy oxygen ions forms a microscopic metal oxide sub-layer on the metal islands. An argon plasma treatment has also been successfully employed to modify the surface of the metal islands.

In another embodiment, at least one and preferably each microscopic transitional sub-layer 13 is formed by depositing a metal oxide sub-layer, which, like a plasma treated sub-layer, also permits an additional layer of discontinuous metal islands to be deposited upon the previous layer of discontinuous metal islands. The microscopic transitional metal oxide sub-layer can be an oxide of the kind of metal that forms the associated discontinuous metal layer. Alternatively, the microscopic transitional metal oxide sub-layer can be an oxide of a metal that is different from the kind of metal that forms the first discontinuous layer of metal islands.

For example, as depicted by FIG. 1, a first discontinuous metal layer 12a may be formed of indium islands deposited upon formable clear coat 11, and metal oxide sub-layer 13a may be deposited indium oxide or tin oxide. As will be appreciated by those skilled in the art, the option of including a microscopic transitional sub-layer (e.g., tin oxide) that is different from the kind of metal that forms the first discontinuous layer of metal islands (e.g., indium) is an advantage of depositing the microscopic transitional sub-layer.

Without being bound to a particular theory, it is believed that the deposited metal oxide sub-layer becomes integrated into the underlying metal islands. Note, however, that undesirable color shifting (i.e., rainbow effects) can occur in the metallized laminate if too much metal oxide is deposited onto a discontinuous layer, thereby overly increasing the microscopic separation of contiguous, discontinuous metal layers.

Those skilled in the art will appreciate that measuring the thickness of the microscopic transitional sub-layers is extremely difficult, if not impossible. Consequently, no definitive measurement yet exists. The presence of the microscopic transitional sub-layers is inferred, however, because, as noted previously, contiguous, discontinuous metal layers tend to consolidate unless surface treatment is effected.

Experiments evaluating the formation of a second discontinuous layer of metal islands upon a first discontinuous layer of metal islands have been conducted (i.e., if and how two distinct layers of metal islands can be deposited contiguously). Such continuous process experiments are set forth (below) in Examples 1–5.

EXAMPLE 1

A two-mil, press-polished Fluorex® film, a polyvinylidene difluoride-acrylic film available from Rexam, was mounted upon a main roller (40° F.) in a closed system having a pressure of about 0.0001 Torr. The Fluorex® film was then plasma treated via 500 W of AC power with 125 standard cubic centimeters per minute (SCCM) of oxygen. Thereafter, a first discontinuous layer of indium islands was deposited via electron beam evaporation (0.11 amps; 6 kV) onto the Fluorexe film. The first discontinuous indium layer possessed an optical density (OD) of 1.15.

EXAMPLE 2

The first discontinuous indium layer of Example 1 was then plasma treated via 500 W of AC power with 125 SCCM of oxygen. After this plasma treatment, the first discontinuous indium layer exhibited significant oxidation. Then, a second discontinuous layer of indium islands was deposited via electron beam evaporation (0.11 amps; 6 kV) onto the first discontinuous indium layer. The second discontinuous layer of indium islands possessed an optical density (OD) of 1.15.

EXAMPLE 3

A second discontinuous layer of indium islands was deposited via electron beam evaporation (0.11 amps; 6 kV) onto the first discontinuous indium layer of Example 1, but unlike Example 2, the first discontinuous indium layer had not been plasma treated. The indium metallized film possessed a slightly yellowish color, similar to that that occurs when the indium islands are relatively large.

EXAMPLE 4

The first discontinuous indium layer of Example 1 was then plasma treated via 500 W of DC power with 125 SCCM of oxygen. After this plasma treatment, the first discontinuous indium layer exhibited slight oxidation. Then, a second discontinuous layer of indium islands was deposited via electron beam evaporation (0.11 amps; 6 kV) onto the first discontinuous indium layer. The second discontinuous layer of indium islands possessed an optical density (OD) of 1.15.

EXAMPLE 5

The first discontinuous indium layer of Example 1 was then plasma treated via 100 W of DC power with 125 SCCM of oxygen, a power reduction from Example 4. After this less intense plasma treatment, the first discontinuous indium layer exhibited no oxidation. Then, a second discontinuous layer of indium islands was deposited via electron beam evaporation (0.11 amps; 6 kV) onto the first discontinuous indium layer. The indium metallized film possessed no color and good uniformity. The second discontinuous-layer of indium islands possessed an optical density (OD) of 1.15.

Examples 1–5 suggest that plasma treatment or the like is necessary to achieve desirable characteristics in the metallized laminates of the present invention. Additional examples further demonstrate the importance of including a microscopic transitional sub-layer (e.g., via plasma treatment or metal oxide deposition) at the interface of contiguous metal layers. These are described below in Examples 6–10 and illustrated in accompanying FIGS. 5–8. For convenience, a 100-nanometer scale (approximate) is provided in each of FIGS. 5–8.

EXAMPLE 6

A press polished Fluorex® polyvinylidene difluoride-acrylic film was mounted upon a main roller (45° F.) in a closed system having a pressure of about 0.0004 Torr.

EXAMPLE 7

The Fluorex® film of Example 6 was AC plasma treated with 125 standard cubic centimeters per minute (SCCM) of oxygen. Thereafter, a discontinuous layer of indium islands was deposited via electron beam evaporation (0.12 amps; 6 kV) onto the Fluorex® film until the discontinuous indium layer possessed an optical density (OD) of 1.1. The indium possessed a bluish tint, which typically characterizes smaller indium island sizes. See FIG. 5.

EXAMPLE 8

The Fluorex® film of Example 6 was AC plasma treated with 125 standard cubic centimeters per minutes (SCCM) of oxygen. Thereafter, a discontinuous layer of indium islands was deposited via electron beam evaporation (0.12 amps; 6 kV) onto the Fluorex® film until the discontinuous indium layer possessed an optical density (OD) of 2.2. The indium, however, possessed a yellowish tint, which typically characterizes larger indium island sizes. See FIG. 6.

EXAMPLE 9

The Fluorex® film of Example 6 was AC plasma treated with 125 standard cubic centimeters per minutes (SCCM) of oxygen. Thereafter, a discontinuous layer of indium islands was deposited via electron beam evaporation (0.12 amps; 6 kV) onto the Fluorex® film until the discontinuous indium layer possessed an optical density (OD) of 1.1. Next, more indium was deposited via electron beam evaporation (0.12 amps; 6 kV) onto the existing indium layer, albeit without first subjecting it to plasma treatment, until the indium achieved a total optical density (OD) of 2.2. Like the indium in Example 8, this indium possessed a yellowish tint, suggesting that the islands from the initial deposition of indium had enlarged as a result of the deposition of additional metal. See FIG. 7.

EXAMPLE 10

The Fluorex® film of Example 6 was AC plasma treated with 125 standard cubic centimeters per minutes (SCCM) of oxygen. Thereafter, a discontinuous layer of indium islands was deposited via electron beam evaporation (0.12 amps; 6 kV) onto the Fluorex® film until the discontinuous indium layer possessed an optical density (OD) of 1.1. Next, the discontinuous indium layer was DC plasma treated with 100 standard cubic centimeters per minutes (SCCM) of oxygen. Thereafter, like Example 9, more indium was deposited via electron beam evaporation (0.12 amps; 6 kV) onto the existing indium layer until the indium achieved a total optical density (OD) of 2.2. Unlike the results from Example 9, however, here the indium possessed a bluish tint, which, as previously noted, characterizes smaller indium island sizes. See FIG. 8.

Example 10 suggests that the plasma treatment of the first discontinuous indium layer creates a microscopic sub-layer. In this regard, it is thought that a microscopic sub-layer (e.g., via plasma treatment or metal oxide deposition) facilitates the deposition of a second discontinuous indium layer that is contiguous to, yet discrete from, the first. This effect is clearly illustrated in FIGS. 5–8.

Figure 5:
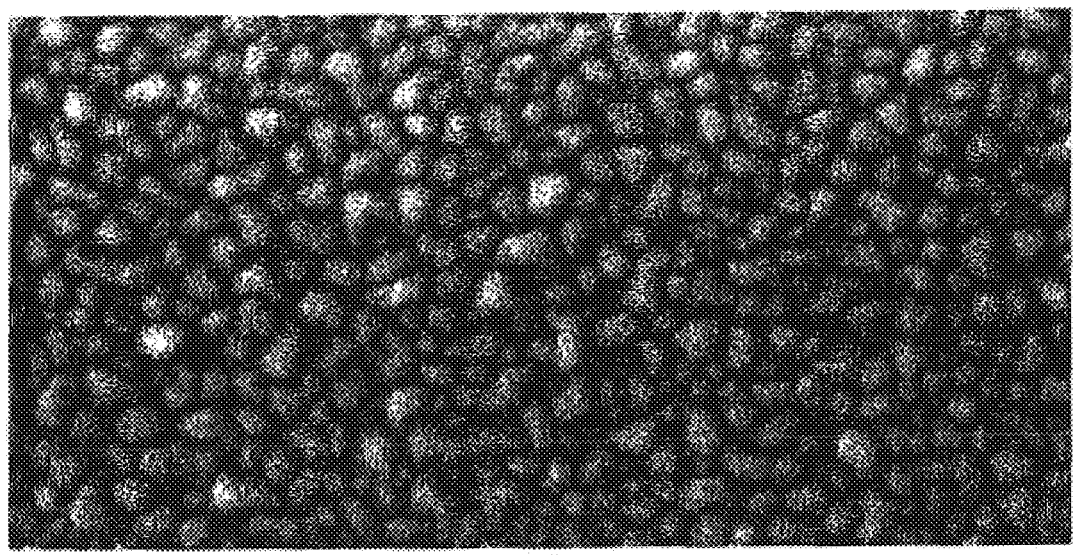
FIGS. 5–8 are microscopic, photographic views of formable metallized laminates having one or more discontinuous metal layers.
Figure 8:
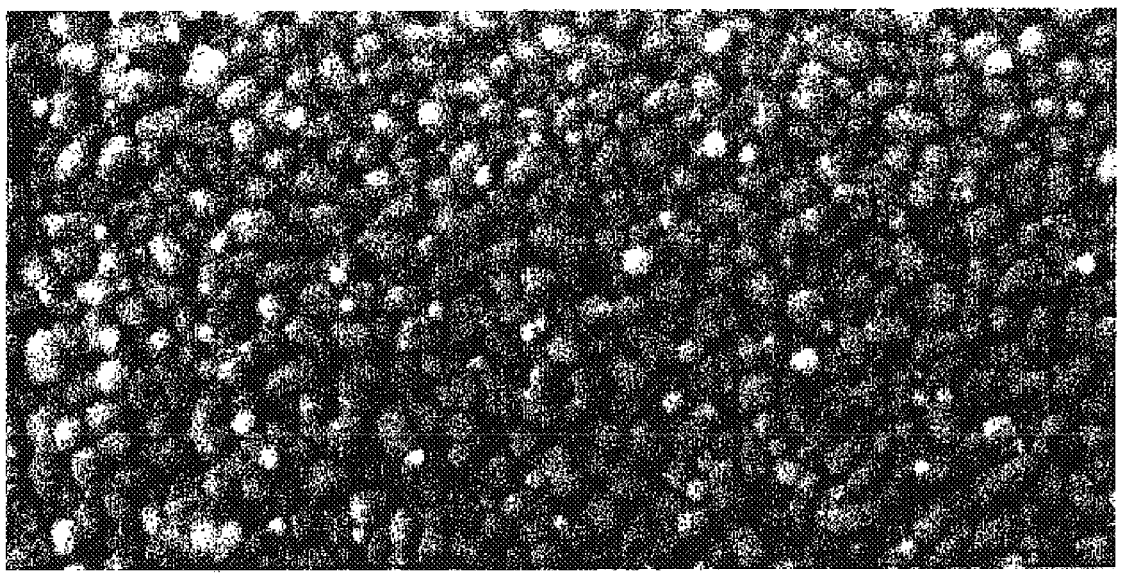
Figure 9:
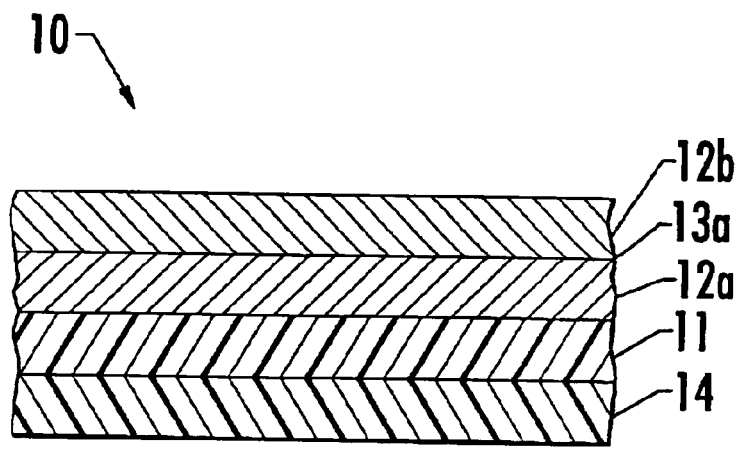
FIG. 9 is a schematic cross-sectional view of the formable metallized laminate having a plurality of discontinuous metal layers on a plurality of formable clear coats.
Figure 10:
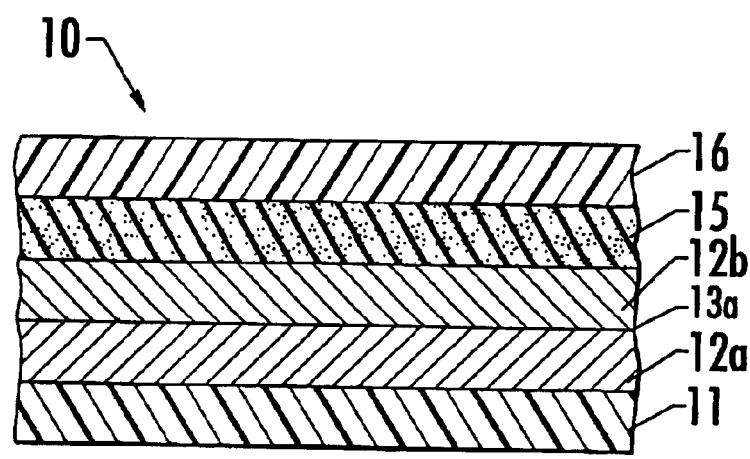
FIG. 10 is also a schematic cross-sectional view of the formable metallized laminate having a plurality of discontinuous metal layers on a formable clear coat film, and further including an adhesive layer and a thermoplastic backing layer.
Figure 11:
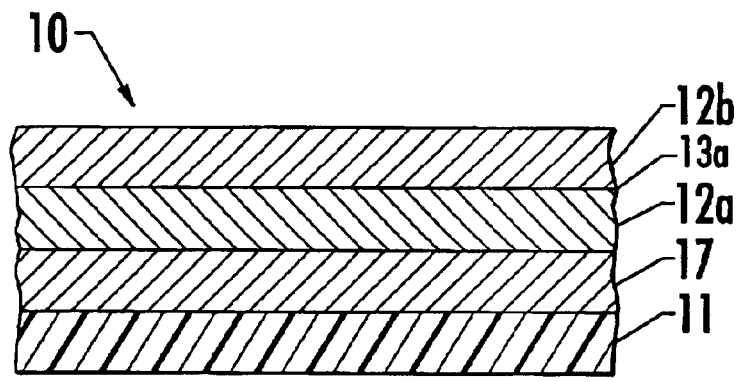
FIG. 11 is a schematic cross-sectional view of the formable metallized laminate having a plurality of discontinuous metal layers on a plurality of formable clear coats, one of which comprises a leveling layer.
Figure 12:
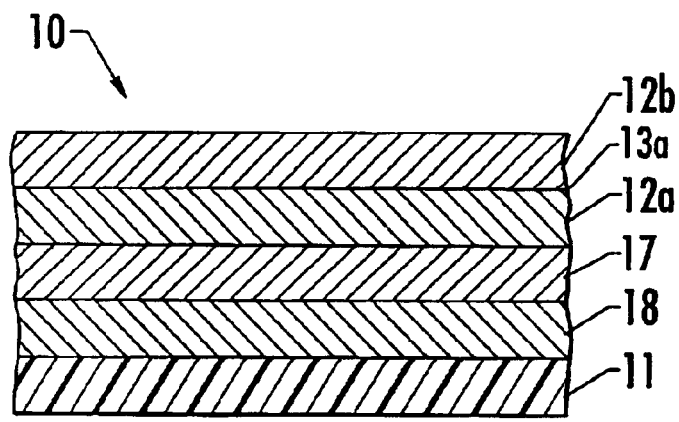
FIG. 12 is a schematic cross-sectional view of the formable metallized laminate having a plurality of discontinuous metal layers on a plurality of formable clear coats, one of which comprises a leveling layer, and further including a primer layer.

For instance, note the size similarity between the discontinuous indium islands of FIG. 8 (Example 10) and the discontinuous indium islands of FIG. 5 (Example 7). As described in Example 10, plasma treatment of the initial discontinuous metal layer makes possible the deposition of a subsequent, discrete discontinuous metal layer.

In contrast, it is thought that failing to form a microscopic sub-layer brings about relatively larger consolidated metal islands when additional metal is deposited onto an initial discontinuous metal layer. This effect (i.e., forming relatively larger, yellowish indium islands) is described in Example 9 and illustrated in FIG. 7. In this regard, note the size similarity between the discontinuous indium islands of FIG. 6 (Example 8), where the indium was deposited onto the Fluorex® film in a lone pass to achieve an optical density of 2.2, and the discontinuous indium islands of FIG. 7 (Example 9), where the indium was deposited onto the Fluorex® film to likewise achieve an optical density of 2.2, albeit in two passes. With respect to FIG. 6, the line within the photograph is 330 nm. With respect to FIG. 7, the line within the photograph is 472 nm.

As described previously, it is believed that, when stretched, a metallized laminate such as that formed according to Example 9 will suffer significantly more iridescence and reduced DOI than will a metallized laminate such as that formed according to Example 10.

It should be further emphasized that, under the conditions described in Example 10 (i.e., plasma treating the initial indium layer), the additional deposition of indium achieved the target optical density (i.e., a 2.2 OD from a 1.1 OD) more than three times faster than under the conditions described in Example 9 (i.e., not plasma treating the initial indium layer). Given that the indium deposition rate was held constant for Examples 7–10, this faster attainment of the target optical density means that less metal was required.

Thus, those skilled in the art should recognize that plasma treatment not only yields smaller island sizes, but also facilitates the use of relatively less metal to achieve a desired optical density. This has important practical implications with respect to manufacturing operations. In brief, the formation of a microscopic sub-layer on the initial metal layer (e.g., via plasma treatment or metal oxide deposition) facilitates both increased production rates and reduced metal costs.

The discontinuous metal layers are preferably formed from aluminum, cadmium, cobalt, copper, chromium, gallium, gold, indium, iron, nichrome, nickel, palladium, platinum, rhodium, stainless steel, tin, zinc, and alloys and blends containing these metals. The discontinuous metal layers—especially the first discontinuous metal layer 12a shown in FIG. 1—preferably include tin, or more preferably indium.

The discontinuous metal layers can have identical or different composition. For example, as depicted by FIG. 1, if first discontinuous metal layer 12a is formed of indium islands, second discontinuous metal layer 12b may be formed of indium islands or tin islands. Moreover, microscopic transitional sub-layer 13a could be a plasma-treated sub-layer or a deposited metal oxide layer (e.g., indium oxide, tin oxide, or zinc oxide). In this regard, the combination of different kinds of metals can create a variegated metallic appearance when a part formed from such a metallized laminate is viewed from different perspectives. This characteristic is expected to be of particular interest to the automotive industry.

It will be appreciated by those of ordinary skill in the art that numerous combinations of discontinuous metal layers and their associated microscopic transitional sub-layers are possible. Accordingly, the aforementioned descriptions are illustrative, not limiting.

The formable clear coat film is typically a polymeric composition. Preferably, the clear coat film is selected from the group consisting of fluoropolymers, acrylic polymers, polyurethanes, ionomers (e.g., surlyn), polycarbonates, polyolefins, polyethylene glycol-modified polyesters (unmodified polyethylene terephthalate forms somewhat poorly, whereas PEG-modified polyesters are formable), polyamide polymers (e.g., nylons), and copolymers, blends, and alloys that include these polymeric compositions. Blends of these compositions include crosslinked and non-crosslinked blends of homopolymers and copolymers. As used herein, the term "copolymers" broadly embraces a composition produced by the simultaneous polymerization of two or more dissimilar monomers. See Hawley's Condensed Chemical Dictionary ($12^{th}$ ed. 1993).

In contrast to the first discontinuous metal layer, which typically has a thickness of less than 0.1 micron, the clear coat film typically has a thickness of about 1–2 mils, or about 25–50 microns. Such clear coat films are readily available in the marketplace. Alternatively, as will be known by those skilled in the art, clear coats may be formed by casting onto a polymeric substrate via knife-over roll coating process, a reverse roll coating process, or a slot die coating process. Alternatively, clear coat films may be extruded onto a polymeric substrate. These techniques are well known in the art and will not be further discussed herein.

It will be understood by those skilled in the art that particular clear coat formulations may be modified to achieve particular results. For example, polyurethane helps to provide flexibility-important in colder climates-whereas acrylic helps to provide gloss and scratch resistance.

The formable clear coat film preferably comprises either polyvinyl fluoride (e.g., DuPont's TEDLAR film) or polyvinylidene difluoride (e.g., Rexam's FLUOREX® film). Other preferred clear coat films comprise between about 30 and 90 weight percent of fluoropolymer, particularly polyvinylidene difluoride, and between about 10 and 70 weight percent of an acrylic polymer, such as polymethyl methacrylate (PMMA) or polyethyl methacrylate (PEMA), or about 50 and 70 weight percent of fluoropolymer, particularly polyvinylidene difluoride, and between about 30 and 50 weight percent acrylic (e.g., about 60 weight percent polyvinylidene difluoride and about 40 weight percent acrylic). In this regard, ELVACITE 2041, which is manufactured by INEOS Acrylics, is a suitable acrylic polymer. A suitable polyvinylidene difluoride polymer is KYNAR 500, which is available from Atofina Chemicals.

In general, higher acrylic percentages offer greater scratch resistance, but at the cost of increased brittleness and less chemical resistance (especially to solvents). Including acrylic in polyvinylidene difluoride films is desirable as 100 percent polyvinylidene difluoride films can cause the metallized laminate to appear somewhat cloudy. In particular, Rexam's FLUOREX® film is a preferred polyvinylidene difluoride/acrylic film. Weatherable clear coats, such as Fluorex®, are often desirable in exterior automotive applications.

In another embodiment, as depicted by FIG. 5, the metallized laminate further includes at least one additional formable clear coat film 14 positioned on the first formable clear coat film 11, opposite the first discontinuous metal layer 12a. In this regard, a copolymer including an acrylic polymer, such as polymethyl methacrylate or polyethyl methacrylate, is desirable to provide excellent scratch resistance.

It will be understood by those skilled in the art that clear coat films may be available in different colors. Accordingly, the formable metallized laminate of the present invention may be made in various colors by incorporating appropriately tinted (i.e., colored) clear coat films. As will be known to those skilled in the art, clear coat films may be tinted, for example, using pigments, inks, or mica, and such can be added as desired without undue experimentation. If tinted, clear coats are preferably transparent rather than opaque.

Moreover, the formable metallized laminate of the present invention may be accentuated with designs, such as patterns, graphics, and even holograms. Such designs are preferably imprinted onto clear coat. For example, ink patterns and graphics may be printed onto any clear coat layer, or a texture, such as a matte finish, may be embossed into the outermost clear coat layer.

Without being bound to a particular theory, it is believed that the use of a microscopically smooth clear coat film in combination with discontinuous metal island layers provides a synergistic result. Accordingly, the formable clear coat film 11 preferably is microscopically smooth at its surface adjacent the first discontinuous metal layer 12a. Such microscopic smoothness has been found to enhance the clarity of the metallized laminate 10. In particular, without microscopic smoothness the metallized film is not optically clear (i.e., mirror-like). Furthermore, microscopically-smooth PVDF copolymers, blends, and alloys not only form exceptionally weatherable clear coats, but also result in a bright metallized laminates having improved optical and deformation properties.

As used herein, the phrase "microscopically smooth" means that the metallized surface is sufficiently smooth to provide a metallized film having excellent optical clarity. For example, Rexam's FLUOREX® film, a polyvinylidene difluoride-containing film, is considered microscopically smooth at a roughness average of 0.75 micron or less. As known to those familiar with microscopic surfaces, the roughness average is the arithmetic average of the absolute values of the deviations of the roughness profile from the mean profile (i.e., "the arithmetic average of all departures of the roughness profile from the mean line"). See U.S. Pat. No. 4,875,262 for a Process for Manufacturing a Grain Chill Roller, at column 4, lines 26–31.

To achieve such microscopic smoothness, the present invention can include processing steps initially disclosed in commonly-assigned U.S. application Ser. No. 09/268,085 for a Bright Metallized Film Laminate, which as noted is incorporated herein in its entirety. One such advancement is the step of press polishing the clear coat film to make it microscopically smooth. For example, some clear coat films, such as polyvinylidene difluoride, are microscopically rough. Microscopic roughness reduces the optical clarity of the resulting metallized film. In other words, exceptional smoothness has a favorable impact on the optical properties of products formed from metallized laminates. Press polishing, as hereinafter disclosed, is the process of smoothing at least one surface of a clear coat film.

In one embodiment, press polishing is directed to the clear coat film, before it is metallized. The clear coat film is continuously coated onto a polymeric substrate, preferably a polyester substrate, and then dried through an oven. As the clear coat film exits the oven, a polymer film, preferably polyester, is applied to the clear coat film, opposite the polymeric substrate. Then, this structure is continuously pressed between a nip that is formed by two rollers, one or both of which are heated. The polymer film is thereafter removed to facilitate metallizing of the clear coat film.

In another embodiment, press polishing is directed to a structure that includes at least one discontinuous layer of metal islands deposited on a clear coat film. First, the discontinuous metal layer and the clear coat film are weakly bonded to polymeric materials. More specifically, the clear coat film is applied to a polymeric substrate, preferably a polyester substrate, opposite the discontinuous metal layer, and a polymer film, preferably a polyester film, is applied to the discontinuous metal layer opposite the clear coat film. Then, this polymeric structure, which includes both a discontinuous metal layer and clear coat film, is fed through a heated nip. Thereafter, the polymer film is removed from the discontinuous metal layer.

Polyester (e.g., polyethylene terephthalate) seems to work best as the polymeric substrate to which the clear coat film is weakly bonded. Likewise, polyester also seems to work best as the polymeric film that is placed upon the discontinuous metal layer. In this regard, DuPont's MYLAR D polyester film from has a smooth surface quite suitable for the press polishing process.

While press polishing is advantageous with respect to clear coat films that are not microscopically smooth, it is unnecessary for clear coat films that are available with at least one microscopically-smooth surface and undesirable for clear coat films that are incompatible with press polishing. For example, DuPont's TEDLAR film, a polyvinyl fluoride film, is commercially available sandwiched between an acrylic adhesive and a polyester substrate. The polyvinyl fluoride surface contiguous to the polyester substrate is generally sufficiently smooth to facilitate the making of an optically clear metallized laminate.

Despite DuPont's technical advice to utilize the acrylic adhesive with its TEDLAR film, in the present invention it is preferred to remove the polyester substrate and then deposit the first discontinuous metal layer directly upon the microscopically-smooth surface of the TEDLAR film itself, rather than upon the adjacent acrylic adhesive layer, which is not acceptably smooth. Preparing an embodiment of the invention in this way provides the opportunity to bond a superior weatherable clear coat, such as Rexam's FLUO-REX® film, to the TEDLAR film via the acrylic adhesive. In this regard, numerous acceptable adhesives, such as DuPont's amine-containing epoxy acrylics 68040, 68070, and 68080, are available for use with DuPont's TEDLAR film.

Figure 6:
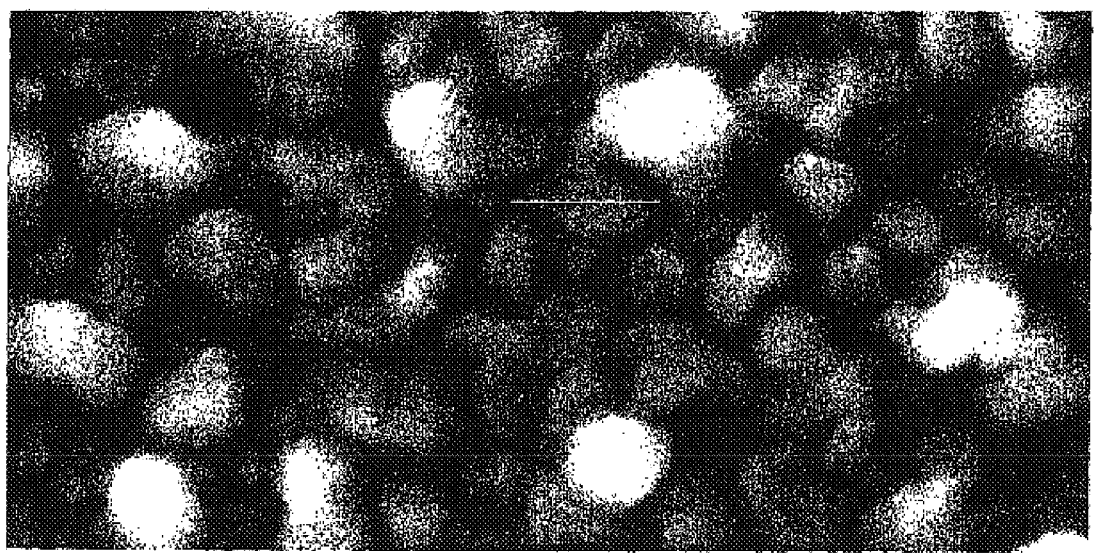

As depicted in FIG. 6, the metallized laminate 10 can further include an adhesive layer 15 positioned on the second discontinuous metal layer 12b, opposite the first discontinuous metal layer 12a, and a thermoplastic backing layer 16 placed on the adhesive layer 15. Most preferably, the adhesive layer 15 is bonded (e.g., via coating or lamination) to the second discontinuous metal layer 12b such that it is contiguous to both the second discontinuous metal layer 12b and the thermoplastic backing layer 16. See FIG. 6.

The adhesive layer 15 preferably comprises a pressure-sensitive adhesive (e.g., GELVA 2591), a heat-reactive adhesive (e.g., ELVACITE 2009 and ELVACITE 2042), or a crosslinking adhesive system (e.g., NOVACOTE 120A). In this regard, it will be understood by those skilled in the art that heat-reactive adhesives are typically thermoplastic adhesives, whereas crosslinking adhesives are typically thermoset adhesives.

The adhesive layer 15 may also comprise a composite adhesive (i.e., a multicomponent adhesive). As used herein, the term "multicomponent adhesive" refers to an adhesive formed from blends of polymers or distinct polymer layers (e.g., including a primer layer). In general, polyurethane adhesives and adhesives including polyurethane have been found to perform exceptionally well. Such adhesives, including acrylic/polyurethane adhesive blends, may be coated onto the second discontinuous metal layer 12b using conventional techniques. NOVACOTE 120A is one suitable polyurethane adhesive.

As will be understood by those skilled in the art, adhesives are typically added to the laminate structure via coating processes. Alternatively, placement of the adhesive layer onto the second discontinuous metal layer sometimes may be facilitated by first forming a multi-component, adhesive composite. For example, this is advantageous if the thermoplastic substrate is incapable of withstanding the heated drying (i.e., curing) of the adhesive components or if the clear coat film is susceptible to attack by a solvent present in the adhesive. To achieve such an adhesive composite, a multicomponent adhesive is formed on a polymeric adhesive carrier substrate before the adhesive layer is bonded to the second discontinuous metal layer.

One such preferred multicomponent adhesive includes a polyurethane layer and an acrylic layer, wherein the polyurethane layer is positioned between the second discontinuous metal layer 12b and the acrylic layer of the adhesive layer 15. See FIG. 6. In this regard, the acrylic adhesive layer improves laminate processing, but is otherwise unnecessary to the resulting bright metallized laminate. A most suitable heat-reactive, thermoplastic acrylic adhesive is 68070, manufactured by DuPont. Likewise, suitable polyurethane adhesives are Stahl's SU26-249 and NOVACOTE ADH 120A. As further described herein, this multicomponent adhesive is especially suitable with acrylonitrile-butadiene-styrene backing layers.

This particular multicomponent adhesive is preferably formed by depositing an acrylic adhesive onto an adhesive carrier substrate, preferably polyester. Then, a polyurethane adhesive layer is deposited onto the acrylic adhesive layer, opposite the adhesive carrier substrate (i.e., the acrylic adhesive layer is sandwiched between the polymeric adhesive carrier substrate and the polyurethane adhesive layer). This creates a kind of pre-formed adhesive composite, which may then be bonded to the second discontinuous metal layer, such that the polyurethane adhesive layer is toward the second discontinuous metal layer. Thereafter, the polymeric adhesive carrier substrate can be removed from the acrylic adhesive layer, thereby leaving in place the adhesive layer, which includes a polyurethane adhesive layer and an acrylic adhesive layer.

Another multicomponent adhesive includes a polyurethane layer, an acrylic layer, and a chlorinated polyolefin layer, wherein the polyurethane layer is positioned between the second discontinuous metal layer 12b and the acrylic layer, and the acrylic layer is positioned between the polyurethane layer and the chlorinated polyolefin layer. As further described herein, this multicomponent adhesive is especially suitable with thermoplastic olefin backing layers.

Yet another multicomponent adhesive includes a layer made of an acrylic/polyurethane blend, and a chlorinated polyolefin layer, wherein the acrylic/polyurethane layer is positioned between the second discontinuous metal layer 12b and the chlorinated polyolefin layer. As further described herein, this multicomponent adhesive is also especially suitable with thermoplastic olefin backing layers.

The solvents present in adhesives (i.e., the adhesive solvent) will sometimes attack clear coat films. Accordingly, the adhesive solvents and clear coats should be chosen for compatibility. Preferably, the adhesive solvent should be a non-solvent with respect to the clear coat film. Otherwise, the adhesive solvent tends to cause a hazy appearance in the metallized laminate. Even so, an adhesive layer may be achieved by coating the surface of the second discontinuous metal layer with an adhesive that includes an adhesive solvent that is also a solvent with respect to the clear coat film, provided that the adhesive solvent is evaporated quickly enough so as not to damage the formable clear coat film or the discontinuous metal layers.

For example, toluene, which is an aggressive solvent to polyvinylidene difluoride/acrylic alloys, may be suitable in forming adhesive layers provided it is evaporated before it can attack the PVDF/acrylic clear coat film. (Polyvinyl fluoride clear coats tend to be more chemical resistant than some PVDF/acrylic clear coats.) To prevent hazing in a clear coat PVDF/acrylic film, the adhesive is preferably a water-based or alcohol-based liquid adhesive that may be coated upon the second discontinuous metal layer 12b.

After the adhesive layer 15 is bonded to the discontinuous second discontinuous metal layer 12b (and any adhesive carrier substrate is removed), a thermoplastic backing layer 16 can be positioned upon the adhesive layer using conventional processes (e.g., heat laminating) known by those of skill in the art. With respect to the thermoplastic backing layer 16, many conventional thermoplastics perform satisfactorily. Certain kinds of thermoplastics, however, are preferred. In particular, the present invention is best practiced by employing a thermoplastic backing layer made from polyvinyl chloride (PVC), thermoplastic olefins (TPO), acrylonitrile-butadiene-styrene copolymers (ABS), polycarbonates, polystyrene, polyamide polymers (e.g., nylons), polyethylene, polypropylene, and copolymers, blends, and alloys of these polymeric compositions. For example, a suitable copolymer includes polyethylene and polypropylene. Moreover, it is preferred that a thermoplastic backing layer formed of either ABS or TPO be corona treated to improve adhesion to the adhesive layer.

In preferred embodiments, the adhesive layer 15 is contiguously positioned on the second discontinuous metal layer 12b, opposite the first discontinuous metal layer 12a, and the thermoplastic backing layer 16 is contiguously positioned on the adhesive layer 15, opposite the second discontinuous metal layer 12b. See FIG. 6.

In such contiguous laminate structures, there are combinations of adhesive layers and thermoplastic backing layers that perform exceptionally well. One preferred embodiment includes a polyurethane adhesive layer 15 paired with either a polyvinyl chloride or an acrylonitrile-butadiene-styrene thermoplastic backing layer 16.

Another preferred embodiment includes a multicomponent adhesive layer formed of a polyurethane layer and an acrylic layer, and an ABS thermoplastic backing layer 16. In this embodiment, the polyurethane layer is sandwiched between the second discontinuous metal layer 12b and the acrylic layer, and the acrylic layer is sandwiched between the polyurethane layer and the ABS thermoplastic backing layer 16 (i.e., the ABS thermoplastic backing layer 16 is contiguous to the acrylic layer).

Yet another preferred embodiment includes a multicomponent adhesive layer 15 formed of a polyurethane layer, an acrylic layer, and a chlorinated polyolefin layer, and a TPO thermoplastic backing layer 16. In this embodiment, the polyurethane layer is sandwiched between the second discontinuous metal layer 12b and the acrylic layer, the acrylic layer is sandwiched between the polyurethane layer and the chlorinated polyolefin layer, and the chlorinated polyolefin layer is sandwiched between the acrylic layer and the TPO thermoplastic backing layer 16 (i.e., the TPO thermoplastic backing layer is contiguous to the chlorinated polyolefin layer).

This multicomponent adhesive is preferably formed by coating a polyurethane adhesive onto the surface of the second discontinuous metal layer. Meanwhile, an acrylic adhesive layer is deposited onto an adhesive carrier substrate, a chlorinated polyolefin layer is deposited onto the acrylic adhesive layer, opposite the adhesive carrier substrate, and a thermoplastic olefin layer is laminated to the chlorinated polyolefin layer, opposite the acrylic adhesive layer. Thereafter, the adhesive carrier substrate is removed from the acrylic adhesive layer and the acrylic adhesive layer is bonded to the polyurethane adhesive layer, opposite the second discontinuous metal layer.

Yet another preferred embodiment includes a multicomponent adhesive layer 15 formed of an acrylic/polyurethane layer and a chlorinated polyolefin layer, and a TPO thermoplastic backing layer 16. In this embodiment, the acrylic/polyurethane layer is sandwiched between the second discontinuous metal layer 12b and the chlorinated polyolefin layer, and the chlorinated polyolefin layer is sandwiched between the acrylic/polyurethane layer and the TPO thermoplastic backing layer 16 (i.e., the TPO backing layer is contiguous to the chlorinated polyolefin layer).

This multicomponent adhesive is preferably formed by coating an acrylic/polyurethane adhesive blend onto the surface of the second discontinuous metal layer. Meanwhile, a chlorinated polyolefin layer is deposited onto an adhesive carrier substrate and a thermoplastic olefin layer is laminated to the chlorinated polyolefin layer, opposite the adhesive carrier substrate. Thereafter, the adhesive carrier substrate is removed from the chlorinated polyolefin layer and the chlorinated polyolefin layer is bonded to the acrylic/polyurethane adhesive blend, opposite the second discontinuous metal layer.

Note that when indium is employed as a discontinuous metal layer, the adhesive layer can prevent the undesirable formation of indium oxide ($In_2O_3$), a whitish, unreflective compound. Similarly, when indium is employed as a discontinuous metal layer and the thermoplastic layer includes polyvinyl chloride, the adhesive layer helps to prevent chloride ion or hydrochloric acid from reacting with the indium layer to form indium trichloride ($InCl_3$), an unreflective compound.

The adhesive layer and the thermoplastic backing layer may be tinted using pigments, inks, or mica. If tinted, adhesive layers and thermoplastic backing layers are preferably opaque rather than transparent. As will be understood by those skilled in the art, the adhesive layer and the thermoplastic backing layer are preferably tinted (i.e., colored) to provide protection from weathering (e.g., via uv radiation).

Figure 7:
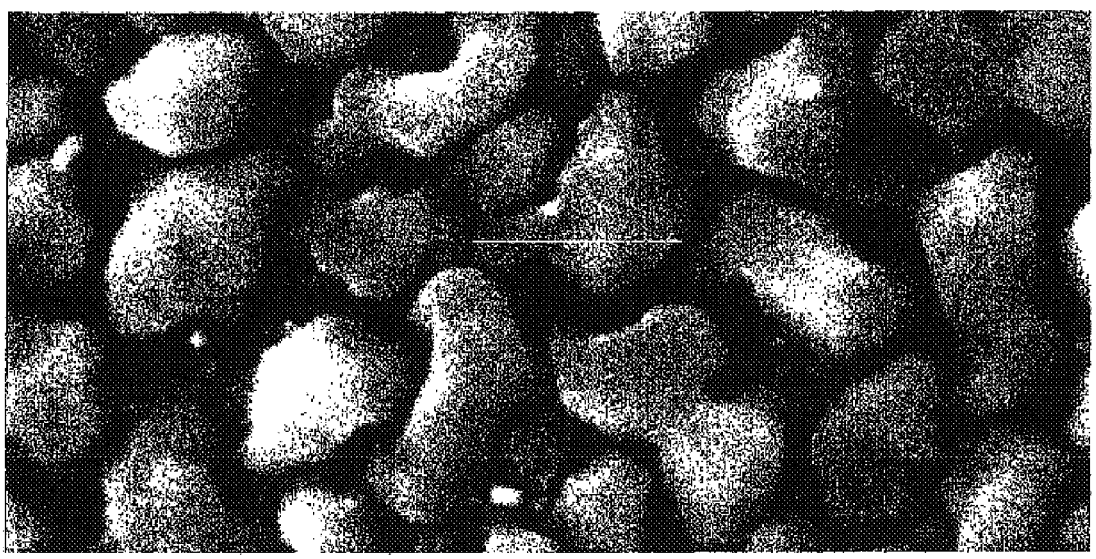

In yet another embodiment depicted in FIG. 7, the metallized formable laminate 10 can include a deposited leveling layer 17 that is positioned between the formable clear coat film 11 and the first discontinuous metal layer 12a. The leveling layer, typically a thermoplastic polymer, can compensate for a clear coat surface that is not microscopically-smooth. The leveling layer 17 preferably includes a polyurethane, an acrylate, or a polyvinyl fluoride polymer.

The leveling layer, which is typically between about 0.5 and 1.0 mil (i.e., about 10 to 25 microns) helps to prevent the discontinuous metal layers from wrinkling during hot processing steps, such as forming processes. As used herein, microscopically wrinkling means folds in the clear coat film having amplitude of less than about 0.5 micron. For example, the presence of a thermoplastic leveling layer helps to ensure that parts formed from the metallized laminate can be successfully injection molded. As will be understood by those of skill in the art, injection molding includes filling the cavity defined by the interior of the formed part with filler material, usually polymeric material.

The leveling layer also helps retain superior distinctness of image (DOI), upwards of 95 DOI. As used herein, distinctness of image is a measure of the optical quality of a reflective surface. DOI is measured using a DOI meter such as the $1^2$R Glow Box Model GB11-86M from Instruments for Research and Industry, Cheltenham, Pa.

In general, although a clear coat is not necessarily a leveling layer, a leveling layer is always a clear coat. Accordingly, a metallized laminate that includes a deposited leveling layer 17 that is positioned between the formable clear coat film 11 and the first discontinuous metal layer 12a (see FIG. 7) is a particular embodiment of a metallized laminate that includes an additional formable clear coat film 14 positioned on the first formable clear coat film 11, opposite the first discontinuous metal layer 12a (see FIG. 5).

As depicted by FIG. 8, a thermoplastic primer layer 18—preferably an acrylic polymer—can be included between the formable clear coat film 11 and the leveling layer 17 (i.e., the thermoplastic primer layer 18 separates the clear coat film 11 and the leveling layer 17). As many clear coats (e.g., PVF and PVDF-acrylic) bond only with difficulty to other polymeric materials, the primer layer 18 promotes bonding between the clear coat film 11 and the leveling layer 17. A preferred primer is DuPont's heat-reactive acrylic 68070, an amine-containing epoxy.

In one embodiment, the leveling layer 17 is a fluoropolymer clear coat, preferably polyvinyl fluoride, and the thermoplastic primer layer 18 is an adhesive that is capable of bonding the fluoropolymer polymer leveling layer 17 to the clear coat film 11. Polyvinyl fluoride film, such as TEDLAR film from DuPont, is commercially available with pre-applied adhesives that facilitate the laminating of the polyvinyl fluoride film to various substrates. For example, TEDLAR film with a pre-applied acrylic adhesive may be employed as the leveling layer 17 and the primer layer 18, respectively, and can be laminated to the clear coat film 11, or the clear coat film 11 can be coated onto the primer layer 18.

In a preferred embodiment, the first formable clear coat film 11 comprises polyvinylidene difluoride (e.g., Rexam's FLUOREX®film), preferably with an acrylic component and the leveling layer 17 comprises polyvinyl fluoride (e.g., DuPont's TEDLAR film). Preferred primers are DuPont's amine-containing epoxy acrylics (e.g., 68040, 68070, and 68080), especially used in conjunction with a polyvinyl fluoride clear coat leveling layer.

In another embodiment, an acrylic primer layer 18 separates on a polyvinylidene difluoride clear coat film 11 (e.g., Rexam's FLUOREX® film) and a polyurethane leveling layer 17, such as Stahl's polyurethane SU6729.

In conformance with the procedure previously described, the clear coat film and the discontinuous metal layer may be press polished despite being separated by either (1) a leveling layer or (2) a primer layer and a leveling layer. Alternatively, the clear coat film may be press polished before the addition of the discontinuous metal layer.

The formable metallized film described herein may be made in a particular color by incorporating an appropriately tinted leveling layer or primer layer. Moreover, as discussed previously, the leveling layer, which is preferably a clear coat, may be imprinted with a design.

Additionally, an extensible mask layer may be added to the outermost clear coat film before forming the metallized laminate. The extensible mask layer is designed to maintain gloss and DOI during thermoforming processes, vacuum forming processes, and molding processes, including injection molding, blow molding, and compression molding. The mask layer also adds strength to the metallized laminate. In particular, the extensible mask layer protects the underlying layers of the metallized laminate from scratching or marring before the formed part is ready for display.

Where high stretch is important, the mask layer is preferably capable of stretching up to about 600 percent during forming and has a room temperature elongation at break of at least about 200 percent (i.e., at between about 15° C. to 30° C.). In this regard, polyurethane mask layers are preferred. Alternatively, where high stretch is relatively unimportant, the mask layer may include polyethylene terephthalate, PEG-modified polyethylene terephthalate, polyamide polymers (e.g., nylons), polyethylene, polypropylene, and copolymers, blends, and alloys including these polymers.

Preferably, the extensible mask layer is pre-formed on a polymeric substrate, such as polyester. The mask layer is placed directly upon the clear coat film and the polymeric substrate is removed from the mask layer. It will be understood by those skilled in the art that if necessary, the polymeric substrate upon which the clear coat film is formed must first be removed.

The mask layer may be retained as a protective outer layer while manufacturing articles from the metallized laminate. The extensible mask layer is releasably bonded to the underlying clear coat film of the metallized laminate and may be stripped away in a single piece to reveal the underlying clear coat film. In a preferred embodiment, the mask layer is substantially transparent to permit visual inspection for surface defects without having to remove the mask layer.

Additionally, the extensible mask layer maintains high gloss and DOI during injection or compression molding, such as thermoplastic or thermoset compression molding, each of which employs a roughened or de-glossed mold. Roughened molds are functionally superior to highly polished molds, despite being less expensive, because the rough mold surface facilitates air removal from the mold as the mold closes. The extensible mask layer protects the metallized laminate from gloss reduction, or other damage caused by the mold, without using highly polished molds.

Preferably, the extensible mask layer is about 0.3 mil to about 3.0 mils thick. As noted, the extensible mask layer preferably comprises a polyurethane polymer. For example, polyurethane polymers QA 5218 and QA 5026, manufactured by Mace Adhesives and Coatings of Dudley, Mass., may be used to form the mask layer, either alone or in mixtures. In one embodiment, the mask layer comprises between about 85 and 99.5 weight percent of a water-based, polyurethane dispersion. Advantageously, a small amount of surfactant (between about 0.05 and 0.2 weight percent) is added to lower surface tension. A preferred surfactant is SURFYNOL 104H, which is manufactured by Air Products of Allentown, Pa.

The mask layer composition may include additives that migrate into the clear coat to enhance weatherability or other desirable properties. (Mask layer additives can also prevent migration of additives from the clear coat into the polyurethane mask layer.) Migratory additives suitable for use with the present invention include, but are not limited to, hardness enhancers, release agents, ultraviolet light stabilizers, antioxidants, dyes, lubricants, surfactants, catalysts, and slip additives.

More specifically, the migratory additives useful in the present invention include benzophenone, silicones, waxes, triazoles, triazines, and combinations of these additives. The migratory additives are forced to migrate into the outer surface of the clear coat film by the heat or pressure present during forming or molding processes. Additionally, the presence of these additives in the mask layer prevents migration of additive components from the clear coat into the mask layer.

Ultraviolet light stabilizers, such as TINUVIN 1130 and TINUVIN 292, both manufactured by Ciba Geigy of Hawthorne, N.Y., can be added to the mask layer composition as migratory additives. Silicone additives, such as BYK333, which is manufactured by BYK Chemie of Wallingford, Conn., can be added to lower the clear coat film's coefficient of friction. The migratory additives are generally added in amounts ranging from between about 0.01 and 2.0 weight percent, with all additives typically accounting for no more than about 5.0 weight percent of the mask layer composition.

Even without the extensible mask layer, the metallized laminates herein described are capable of retaining their desirable optical properties even upon undergoing tremendous deformation, including being stretched and die cut in amounts of up to 50–100 area percent while retaining a DOI of 95 or better. This promotes the use of the metallized laminate in additional kinds of forming operations. In particular, the formable metallized laminate of the present invention is especially useful in articles of manufacture, such as auto parts.

The term "forming" is herein used in a broad sense and can include various, relatively specific techniques that include, but are not limited to, injection molding, thermoforming, blow molding, compression molding, vacuum forming, and "in-mold" forming (e.g., concurrent filling and forming), as well as any other modified or related techniques (e.g., extrusion lamination) that take advantage of the thermoplastic nature of the polymer portions of films according to the present invention. (The films according to the present invention may also be die cut using methods that are well known to those of skill in the art.

In one thermoforming method, the metallized laminate may be placed over a relatively cooler article such that when the air between the metallized laminate and the article is removed, the metallized laminate will adhere to the contours of the article. This has been found to be effective in forming either male or female parts. In particular, this method includes heating the metallized laminate to a temperature warmer than the surface of an article to which the metallized laminate is to be bonded, placing the metallized laminate upon the article, and creating a vacuum about the article to shape and conform the laminate to the contours of the article. The temperatures at which the forming operations proceed depend largely upon the composition of the thermoplastic backing layer. For example, where PVC or ABS are employed as the thermoplastic backing layer, the metallized laminate at a temperature of between about 280° and 370° F. is placed over an article having a surface temperature of less than about 120° F.

As will be known to those of skill in the art, removal of entrained air may be accomplished by placing the metallized laminate onto the article under reduced pressure conditions (i.e., less than atmospheric pressure). The inventors have discovered that this process reduces iridescence of the formed, metallized film laminate. As will also be known by those skilled in the art, iridescence is a rainbow-like display of color that is caused by differential light refraction.

EXAMPLE 11

After the indium islands are plasma-treated, a second layer of discontinuous indium islands is deposited on the first plasma-treated indium layer, opposite microscopically smooth clear coat. Subsequent layers are formed in a similar way, provided the separation between the respective layers is minimized to prevent iridescence.

EXAMPLE 12

Alternatively, tin or zinc may be substituted for indium in one or more of the metal layers (e.g., indium-zinc-indium or, more preferably, tin-indium-tin). In the latter embodiment, it is theorized that the indium melts during thermoforming to form a lubricant layer between the tin layers.

EXAMPLE 13

An embodiment of the bright metallized formable film laminate can be formed using the following steps: press polishing a FLUOREX® clear film (Rexam) by bonding it to a 1 mil polyethylene terephthalate film (DuPont) via a hot nip (330–380° F.), and thereafter removing the polyethylene terephthalate film from the FLUOREX® clear film; depositing (via vacuum deposition) a first layer of indium at an optical density (OD) of about 1.15 onto the polished surface of the FLUOREX® clear film; plasma treating the first indium layer by exposing it to high-energy oxygen ions, and thereafter depositing (via vacuum deposition) a second indium layer at an optical density (OD) of about 1.15 onto the first indium layer; casting a polyurethane adhesive (NOVACOTE ADH 120ASL) onto the second indium layer at a dry thickness of 0.5 mil; and then bonding the adhesive to a 20 mil ABS through a nip.

EXAMPLE 14

Another embodiment of the bright metallized formable film laminate can be formed using the following steps: preparing, at about 125° F., a PVDF-containing clear coat mixture having a 60/40 weight ratio of polyvinylidene difluoride (Atofina Chemicals KYNAR SL) to acrylic (INEOS Acrylics ELVACITE 2041); providing a polyvinyl fluoride film to which an acrylic adhesive is pre-applied (DuPont TEDLAR SP film); coating the adhesive side of the polyvinyl fluoride film with the PVDF-acrylic clear coat mixture and then drying the PVDF-acrylic clear coat mixture for 2 minutes at 170° F. and 3 minutes at 310° F. to achieve a PVDF/acrylic clear coat having a dry thickness of about 1.0 mil; plasma treating the polyvinyl fluoride film by exposing it to high-energy oxygen ions, and then depositing thereon a layer of indium at an optical density (OD) of about 1.1 using a DC magnetron sputtering system; plasma treating the indium layer by exposing it to high-energy oxygen ions, and then depositing thereon a layer of tin at an optical density (OD) of about 1.1 using a DC magnetron sputtering system; coating a polyurethane adhesive layer (NOVACOTE ADH NC120A) onto the tin layer; drying the polyurethane adhesive layer for 2 minutes at 170° F. and 2 minutes at 270° F. to yield a dry thickness of about 0.7 mil; laminating this intermediate structure to a 19-mil, corona-treated ABS film.

In the drawings and specification, typical embodiments of the invention have been disclosed. Specific terms have been used only in a generic and descriptive sense, and not for purposes of limitation. The scope of the invention is set forth in the following claims.

What is claimed is:

1. A formable, bright metallized laminate, comprising:
   a formable clear coat film;
   a first discontinuous layer of metal islands deposited on said formable clear coat film; and
   a second discontinuous layer of metal islands, wherein said first discontinuous layer of metal islands is positioned between said formable clear coat film and said second discontinuous layer of metal islands, and wherein said formable clear coat film has a microscopically-smooth surface, wherein the microscopically-smooth surface of said formable dear coat film has a roughness average of less than about 0.75 micron.

2. A metallized laminate according to claim 1, wherein said formable clear coat film is a tinted clear coat film.

3. A metallized laminate according to claim 1, wherein said formable clear coat film has a graphic design pattern applied to it.

4. A metallized laminate according to claim 1, wherein said formable clear coat film comprises polyvinyl fluoride.

5. A metallized laminate according to claim 1, wherein said formable dear coat film comprises polyvinylidene difluoride.

6. A metallized laminate according to claim 1, wherein said formable clear coat film is a polymeric composition selected from the group consisting of fluoropolymers, acrylic polymers, polyurethanes, ionomers, polycarbonates, polyolefins, polyethylene glycol-modified polyesters, polyamide polymers, and copolymers, blends, and alloys that include these polymeric compositions.

7. A metallized laminate according to claim 1, wherein said formable clear coat film comprises between about 10 and 70 weight percent of an acrylic polymer and between about 30 and 90 weight percent of a fluoropolymer.

8. A metallized laminate according to claim 7, wherein said formable clear coat film comprises between about 30 and 50 weight percent of an acrylic polymer and between about 50 and 70 weight percent of a fluoropolymer comprising polyvinylidene difluoride.

9. A metallized laminate according to claim 1, said first discontinuous metal layer having a first surface that is contiguous to said formable clear coat film, and a second surface that is contiguous to said second discontinuous metal layer, wherein said second surface of said first metal layer includes a microscopic transitional sublayer.

10. A metallized laminate according to claim 9, wherein said microscopic transitional sub-layer is a plasma-treated sublayer.

11. A metallized laminate according to claim 9, wherein said microscopic transitional sub-layer is a deposited metal oxide sub-layer.

12. A metallized laminate according to claim 11, wherein the composition of said microscopic transitional metal oxide sublayer is an oxide of the metal that forms said first discontinuous layer of metal islands.

13. A metallized laminate according to claim 11, wherein the composition of said microscopic transitional metal oxide sub-layer is an oxide of a metal that is different from the metal that forms said first discontinuous layer of metal islands.

14. A metallized laminate according to claim 1, wherein said first discontinuous metal layer is selected from the group consisting of indium, tin, and alloys and blends thereof.

15. A metallized laminate according to claim 1, wherein said first discontinuous metal layer and said second discontinuous metal layer are selected from the group consisting of aluminum, cadmium, cobalt, copper, chromium, gallium, gold, indium, iron, nichrome, nickel, palladium, platinum, rhodium, stainless steel, tin, zinc, and alloys and blends containing these metals.

16. A metallized laminate according to claim 1, wherein said second discontinuous metal layer has the same composition as said first discontinuous metal layer.

17. A metallized laminate according to claim 1, wherein said second discontinuous metal layer has a different composition from said first discontinuous metal layer.

18. A metallized laminate according to claim 1, wherein said second discontinuous metal layer comprises metal islands having an average width of less than about 400 nm.

19. A metallized laminate according to claim 1, wherein said second discontinuous metal layer comprises metal islands having an average width of less than about 200 nm.

20. A metallized laminate according to claim 1, wherein said second discontinuous metal layer comprises metal islands having an average width of less than about 100 mm.

21. A metallized laminate according to claim 1, further comprising at least one additional discontinuous layer of metal islands positioned between said first discontinuous metal layer and said second discontinuous metal layer.

22. A metallized laminate according to claim 21, wherein:
   all discontinuous metal layers are contiguous; and
   said first discontinuous metal layer and each said additional discontinuous metal layer have a first surface that is nearer the formable clear coat film and a second surface that is on the side opposite to the side that is nearer the formable clear coat film, wherein each said second surface comprises a microscopic transitional sublayer.

23. A metallized laminate according to claim 1, further comprising an adhesive layer positioned on said second discontinuous metal layer, on the side opposite to the side nearer said first discontinuous metal layer.

24. A metallized laminate according to claim 23, wherein said adhesive layer comprises a pressure-sensitive adhesive.

25. A metallized laminate according to claim 23, wherein said adhesive layer comprises a heat-reactive adhesive.

26. A metallized laminate according to claim 23, wherein said adhesive layer comprises a crosslinking adhesive system.

27. A metallized laminate according to claim 23, wherein said adhesive layer comprises a multicomponent adhesive.

28. A metallized laminate according to claim 23, wherein said adhesive layer comprises polyurethane.

29. A metallized laminate according to claim 23, wherein said adhesive layer comprises acrylic.

30. A metallized laminate according to claim 23, wherein:
   said adhesive layer comprises a polyurethane layer and an acrylic layer; and
   said polyurethane layer of said adhesive layer is positioned between said second discontinuous metal layer and said acrylic layer of said adhesive layer.

31. A metallized laminate according to claim 23, wherein:
   said adhesive layer comprises a polyurethane layer, an acrylic layer, and a chlorinated polyolefin layer;
   said polyurethane layer is positioned between said second discontinuous metal layer and said acrylic layer; and
   said acrylic layer is positioned between said polyurethane layer and said chlorinated polyolefin layer.

32. A metallized laminate according to claim 23, wherein:
   said adhesive layer comprises a layer made of an acrylic/polyurethane blend, and a chlorinated polyolefin layer; and said acrylic/polyurethane layer is positioned between said second discontinuous metal layer and said chlorinated polyolefin layer.

33. A metallized laminate according to claim 23, further comprising a thermoplastic backing layer placed on said adhesive layer.

34. A metallized laminate according to claim 33, wherein said thermoplastic backing layer is selected from the group consisting of polyvinyl chloride, thermoplastic olefins, polycarbonates, acrylonitrile-butadiene-styrene copolymers, polystyrene, polyamide polymers, polyethylene, polypropylene, and copolymers, blends, and alloys including these polymeric compositions.

35. A metallized laminate according to claim 33, wherein the metallized laminate incorporates a single tinted layer selected from the group consisting of said clear coat film, said adhesive layer, and said thermoplastic backing layer.

36. A metallized laminate according to claim 1, further comprising an adhesive layer contiguously positioned on said second discontinuous metal layer, on the side opposite to the side nearer said first discontinuous metal layer.

37. A metallized laminate according to claim 36, further comprising a thermoplastic backing layer contiguously positioned on said adhesive layer, on the side opposite to the side nearer said second discontinuous metal layer, wherein said adhesive layer comprises polyurethane and said thermoplastic backing layer is selected from the group consisting of polyvinyl chloride and acrylonitrile-butadiene-styrene copolymers.

38. A metallized laminate according to claim 36, further comprising a thermoplastic backing layer; and wherein said adhesive layer comprises a polyurethane layer and an acrylic layer, said polyurethane layer of said adhesive layer being contiguously positioned between said second discontinuous metal layer and said acrylic layer of said adhesive layer; and wherein said thermoplastic backing layer comprises an acrylonitrile-butadiene-styrene copolymer layer contiguously positioned on said acrylic layer of said adhesive layer.

39. A metallized laminate according to claim 36, further comprising a thermoplastic backing layer; and
wherein said adhesive layer comprises a polyurethane layer, an acrylic layer, and a chlorinated polyolefin layer, said polyurethane layer being contiguously positioned between said second discontinuous metal layer and said acrylic layer, and said acrylic layer being contiguously positioned between said polyurethane layer and said chlorinated polyolefin layer; and
wherein said thermoplastic backing layer comprises a thermoplastic olefin layer contiguously positioned on said chlorinated polyolefin layer of said adhesive layer.

40. A metallized laminate according to claim 36, further comprising a thermoplastic backing layer;
wherein said adhesive layer comprises an acrylic/polyurethane layer and a chlorinated polyolefin layer, said acrylic/polyurethane layer being contiguously positioned between said second discontinuous metal layer and said chlorinated polyolefin layer; and
wherein said thermoplastic backing layer comprises a thermoplastic olefin layer contiguously positioned on said chlorinated polyolefin layer of said adhesive layer.

41. A metallized laminate according to claim 1, further comprising at least one additional formable clear coat film positioned on said formable clear coat film, on the side opposite to the side nearer said first discontinuous metal layer.

42. A metallized laminate according to claim 1, further comprising an extensible mask layer on the surface of said formable clear coat film on the side opposite to the side nearer said first discontinuous metal layer.

43. A metallized laminate according to claim 1, further comprising a thermoplastic leveling layer that is positioned between said formable clear coat film and said first discontinuous metal layer.

44. A metallized laminate according to claim 43, wherein said thermoplastic leveling layer comprises polyvinyl fluoride and said formable dear coat film comprises polyvinylidene difluoride.

45. A metallized laminate according to claim 43, further comprising a thermoplastic primer layer positioned between said formable clear coat film and said leveling layer.

46. A part formed from the formable metallized laminate of claim 1.

47. A part according to claim 46 that has been formed using a technique selected from the group consisting of injection molding, blow molding, compression molding, thermoforming, vacuum forming, in-mold forming, and extrusion lamination.

48. A formable, bright metallized laminate, comprising:
a formable polymeric dear coat film;
a first discontinuous layer of metal islands deposited on said clear coat film; and
a second discontinuous layer of metal islands, wherein said first discontinuous layer of metal islands is positioned between said clear coat film and said second discontinuous layer of metal islands;
wherein said first discontinuous metal layer has a first surface that is contiguous to said formable clear coat film, and a second surface that is contiguous to said second discontinuous metal layer, wherein said second surface of said first metal layer includes a microscopic transitional sub-layer.

49. A metallized laminate according to claim 48, wherein said microscopic transitional sub-layer is a plasma-treated sub-layer.

50. A metallized laminate according to claim 48, wherein said microscopic transitional sublayer is a deposited metal oxide sub-layer.

51. A metallized laminate according to claim 48, wherein said second discontinuous metal layer comprises metal islands having an average width of less than about 200 nm.

52. A metallized laminate according to claim 48, wherein said second discontinuous metal layer comprises metal islands having an average width of less than about 100 nm.

53. A metallized laminate according to claim 48, wherein said formable clear coat film is a polymeric composition selected from the group consisting of fluoropolymers, acrylic polymers, polyurethanes, ionomers, polycarbonates, polyolefins, PEG-modified polyesters, polyamide polymers, and copolymers, blends, and alloys that include these polymeric compositions.

54. A metallized laminate according to claim 48, wherein said first discontinuous metal layer and said second discontinuous metal layer are selected from the group consisting of aluminum, cadmium, cobalt, copper, chromium, gallium, gold, indium, iron, nichrome, nickel, palladium, platinum, rhodium, stainless steel, tin, zinc, and alloys and blends containing these metals.

55. A metallized laminate according to claim 48, further comprising an additional formable clear coat film positioned on said formable clear coat film, opposite said first discontinuous metal layer.

56. A metallized laminate according to claim 48, further comprising an adhesive layer placed on said second discontinuous metal layer, on the side opposite to the side nearer said first discontinuous metal layer.

57. A metallized laminate according to claim 56, further comprising a thermoplastic backing layer placed on said adhesive layer.

58. A part formed from the metallized laminate of claim 48.

59. A formable, bright metallized laminate, comprising:
a formable clear coat film; and
a plurality of discontinuous metal island layers deposited on said clear coat film, said plurality of discontinuous metal island layers comprising a first outer discontinuous layer of metal islands that is deposited on said dear coat film, a second outer discontinuous layer of metal islands, and at least one inner discontinuous layer of metal islands positioned between said first and second outer discontinuous metal layers.

60. A metallized laminate according to claim 59, wherein said formable clear coat film comprises polyvinyl fluoride.

61. A metallized laminate according to claim 59, wherein said-formable clear coat film comprises polyvinylidene difluoride.

62. A metallized laminate according to claim 59, wherein said formable clear coat film is a polymeric composition selected from the group consisting of fluoropolymers, acrylic polymers, polyurethanes, ionomers, polycarbonates, polyolefins, PEG-modified polyesters, polyamide polymers, and copolymers, blends, and alloys including these polymeric compositions.

63. A metallized laminate according to claim 59, wherein said formable clear coat film comprises between about 10 and 70 weight percent of an acrylic polymer and between about 30 and 90 weight percent of fluoropolymer.

64. A metallized laminate according to claim 59, wherein at least one of said plurality of discontinuous metal layers is selected from the group consisting of aluminum, cadmium, cobalt, copper, chromium, gallium, gold, indium, iron, nichrome, nickel, palladium, platinum, rhodium, stainless steel, tin, zinc, and alloys and blends containing these metals.

65. A metallized laminate according claim 59, further comprising a thermoplastic leveling layer that is positioned between said formable clear coat film and said first outer discontinuous layer, wherein said thermoplastic leveling layer comprises polyvinyl fluoride and said formable clear coat film comprises polyvinylidene difluoride.

66. A metallized laminate according to claim 59, wherein the layers defining said plurality of discontinuous metal island layers are contiguous with one another.

67. A metallized laminate according to claim 66, wherein:
said first outer discontinuous metal layer and each said inner discontinuous metal layer have a first surface that is nearer the formable clear coat film and a second surface that is on the side opposite to the side that is nearer the formable clear coat film; and
each said second surface comprises a microscopic transitional sublayer.

68. A metallized laminate according to claim 67, wherein each said microscopic transitional sublayer is selected from the group consisting of a plasma-treated sublayer and a deposited metal oxide sublayer.

69. A metallized laminate according to claim 59, wherein said second outer discontinuous metal layer comprises metal islands having an average width of less than about 400 nm.

70. A metallized laminate according to claim 59, wherein said second outer discontinuous metal layer comprises metal islands having an average width of less than about 200 nm.

71. A metallized laminate according to claim 59, wherein said second outer discontinuous metal layer comprises metal islands having an average width of less than about 100 nm.

72. A metallized laminate according to claim 59, further comprising an adhesive layer positioned on said second outer discontinuous metal layer, on the side opposite to the side that is nearer said formable clear coat film.

73. A metallized laminate according to claim 72, wherein said adhesive layer is selected from the group consisting of pressure-sensitive adhesives, heat-reactive adhesives, crosslinking adhesives, and multicomponent adhesives.

74. A metallized laminate according to claim 72, wherein said adhesive layer comprises polyurethane.

75. A metallized laminate according to claim 72, wherein said adhesive layer comprises acrylic.

76. A metallized laminate according to claim 72, further comprising a thermoplastic backing layer placed on said adhesive layer, wherein said backing layer is selected from the group consisting of polyvinyl chloride, thermoplastic olefins, polycarbonates, acrylonitrile butadiene-styrene copolymers, polystyrene, polyamide polymers, polyethylene, polypropylene, and copolymers, blends, and alloys including these polymeric compositions.

77. A metallized laminate according to claim 76, wherein the metallized laminate incorporates a single tinted layer selected from the group consisting of said clear coat film, said adhesive layer, and said thermoplastic backing layer.

78. A metallized laminate according to claim 59, further comprising at least one additional formable clear coat film positioned on said formable clear coat film, on the side opposite to the side that is nearer said first outer discontinuous metal layer.

79. A metallized laminate according to claim 59, further comprising an extensible mask layer on the surface of said formable clear coat film, on the side opposite to the side that is nearer said first outer discontinuous metal layer.

80. A part formed from the formable metallized laminate of claim 59.

81. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, and wherein said formable clear coat film comprises between about 10 and 70 weight percent of an acrylic polymer and between about 30 and 90 weight percent of a fluoropolymer.

82. The metallized laminate according to claim 81, wherein said formable clear coat film comprises between about 30 and 50 weight percent of an acrylic polymer and between about 50 and 70 weight percent of a fluoropolymer comprising polyvinylidene difluoride.

83. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, said first discontinuous metal layer having a first surface that is contiguous to said formable clear coat film, and a second surface that is contiguous to said second discontinuous metal layer, wherein said second surface of said first metal layer includes a microscopic transitional sub-layer.

84. The metallized laminate according to claim 83, wherein said microscopic transitional sublayer is a plasma-treated sub-layer.

85. The metallized laminate according to claim 83, wherein said microscopic transitional sublayer is a deposited metal oxide sublayer.

86. The metallized laminate according to claim 85, wherein the composition of said microscopic transitional metal oxide sublayer is an oxide of the metal that forms said first discontinuous layer of metal islands.

87. The metallized laminate according to claim 85, wherein the composition of said microscopic transitional metal oxide sublayer is an oxide of a metal that is different from the metal that forms said first discontinuous layer of metal islands.

88. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising at least one additional discontinuous layer of metal islands positioned between said first discontinuous metal layer and said second discontinuous metal layer.

89. The metallized laminate according to claim 88, wherein:
all discontinuous metal layers are contiguous; and
said first discontinuous metal layer and each said additional discontinuous metal layer have a first surface that is nearer the formable clear coat film and a second surface that is on the side opposite to the side that is nearer the formable clear coat film, wherein each said second surface comprises a microscopic transitional sub-layer.

90. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein said adhesive layer comprises a pressure-sensitive adhesive.

91. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein said adhesive layer comprises a heat-reactive adhesive.

92. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein said adhesive layer comprises a crosslinking adhesive system.

93. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein said adhesive layer comprises a multicomponent adhesive.

94. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein said adhesive layer comprises polyurethane.

95. A formable, bright metallized laminate, comprising
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein said adhesive layer comprises acrylic.

96. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein:
said adhesive layer comprises a polyurethane layer and an acrylic layer; and
said polyurethane layer of said adhesive layer is positioned between said second discontinuous metal layer and said acrylic layer of said adhesive layer.

97. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein:
said adhesive layer comprises a polyurethane layer, an acrylic layer, and a chlorinated polyolefin layer;
said polyurethane layer is positioned between said second discontinuous metal layer and said acrylic layer; and
said acrylic layer is positioned between said polyurethane layer and said chlorinated polyolefin layer.

98. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer positioned on said second discontinuous metal layer, on the side opposite to the side nearer said first discontinuous metal layer, wherein:
said adhesive layer comprises a layer made of an acrylic/polyurethane blend, and a chlorinated polyolefin layer; and
said acrylic/polyurethane layer is positioned between said second discontinuous metal layer and said chlorinated polyolefin layer.

99. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer contiguously positioned on said second discontinuous metal layer, on the side opposite to the side nearer said first discontinuous metal layer, further comprising a thermoplastic backing layer; and wherein said adhesive layer comprises a polyurethane layer and an acrylic layer, said polyurethane layer of said adhesive layer being contiguously positioned between said second discontinuous metal layer and said acrylic layer of said adhesive layer; and wherein said thermoplastic backing layer comprises an acrylonitrile-butadiene-styrene copolymer layer contiguously positioned on said acrylic layer of said adhesive layer.

100. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable dear coat film and said second discontinuous layer of metal islands, further comprising an adhesive layer contiguously positioned on said second discontinuous metal layer, on the side opposite to the side nearer said first discontinuous metal layer, further comprising a thermoplastic backing layer; and
wherein said adhesive layer comprises a polyurethane layer, an acrylic layer, and a chlorinated polyolefin layer, said polyurethane layer being contiguously positioned between said second discontinuous metal layer and said acrylic layer, and said acrylic layer being contiguously positioned between said polyurethane layer and said chlorinated polyolefin layer; and
wherein said thermoplastic backing layer comprises a thermoplastic olefin layer contiguously positioned on said chlorinated polyolefin layer of said adhesive layer.

101. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising an adhesive layer contiguously positioned on said second discontinuous metal layer, on the side opposite to the side nearer said first discontinuous metal layer, further comprising a thermoplastic backing layer;
wherein said adhesive layer comprises an acrylic/polyurethane layer and a chlorinated polyolefin layer, said acrylic/polyurethane layer being contiguously positioned between said second discontinuous metal layer and said chlorinated polyolefin layer; and
wherein said thermoplastic backing layer comprises a thermoplastic olefin layer contiguously positioned on said chlorinated polyolefin layer of said adhesive layer.

102. A formable, bright metallized laminate, comprising:
a formable clear coat film;
a first discontinuous layer of metal islands deposited on said formable clear coat film; and
a second discontinuous layer of metal islands, wherein said first discontinuous layer of metal islands is positioned between said formable clear coat film and said second discontinuous layer of metal islands, further comprising a thermoplastic leveling layer that is positioned between said formable clear coat film and said first discontinuous metal layer.

103. The metallized laminate according to claim 102, wherein said thermoplastic leveling layer comprises polyvinyl fluoride and said formable clear coat film comprises polyvinylidene difluoride.

104. The metallized laminate according to 102, further comprising a thermoplastic primer layer positioned between said formable clear coat film and said leveling layer.

* * * * *